US012670681B2

(12) United States Patent
Boudia et al.

(10) Patent No.: US 12,670,681 B2
(45) Date of Patent: Jun. 30, 2026

(54) DEVICE, SYSTEM, AND METHOD FOR MORE EFFICIENTLY CONTROLLING CLIENT DEVICES TO PROVIDE COMMON CONTENT

(71) Applicant: AMADEUS S.A.S., Biot (FR)

(72) Inventors: Mourad Boudia, Antibes (FR); Nicolas Hauviller, Valbonne (FR); Fatih Donmez, Biot (FR)

(73) Assignee: Amadeus S.A.S., Biot (FR)

( * ) Notice: Subject to any disclaimer, the term of this patent is extended or adjusted under 35 U.S.C. 154(b) by 107 days.

(21) Appl. No.: 18/782,620

(22) Filed: Jul. 24, 2024

(65) Prior Publication Data
US 2025/0061674 A1     Feb. 20, 2025

(30) Foreign Application Priority Data
Aug. 14, 2023     (EP) .................................... 23315313

(51) Int. Cl.
| | |
|---|---|
| *G06T 19/20* | (2011.01) |
| *G06T 7/70* | (2017.01) |
| *G06T 13/40* | (2011.01) |

(52) U.S. Cl.
CPC ................ *G06T 19/20* (2013.01); *G06T 7/70* (2017.01); *G06T 13/40* (2013.01); *G06T 2219/2004* (2013.01); *G06T 2219/2016* (2013.01)

(58) Field of Classification Search
CPC ........... G06T 19/20; G06T 7/70; G06T 13/40; G06T 2219/2004; G06T 2219/2016
See application file for complete search history.

(56) References Cited

U.S. PATENT DOCUMENTS

| | | | |
|---|---|---|---|
| 10,057,310 B1 * | 8/2018 | Grunewald | ........ H04N 21/4781 |
| 2011/0225519 A1 | 9/2011 | Goldman et al. | |
| 2016/0133230 A1 * | 5/2016 | Daniels | ................. G06F 3/147 |
| | | | 345/633 |
| 2017/0354875 A1 | 12/2017 | Marks et al. | |

(Continued)

OTHER PUBLICATIONS

European Search Report, mailed Oct. 23, 2023, issued in corresponding European Patent Application No. 23315313.9, filed Aug. 14, 2023.

*Primary Examiner* — Terrell M Robinson
(74) *Attorney, Agent, or Firm* — PERRY + CURRIER INC.

(57) ABSTRACT

A device, system and method for more efficiently controlling client devices to provide common content is provided. A computing device: determines that avatars, associated with client devices interfacing with a virtual platform, are within a given distance of each other and/or located in a common area of the platform; and accesses respective associated data comprising: respective static data associated with users of the devices, and/or respective dynamic data indicative of orientation of the avatars within the platform and/or interactions of two or more of the avatars within the platform. The computing device determines, from the data: avatar subset associated with respective content, the subsets each including two or more of the avatars. The computing device causes respective devices, associated with the subsets, to provide the respective content in association with the subsets, such that two or more of the respective devices associated with a same subset provide respective common content.

20 Claims, 9 Drawing Sheets

(56) References Cited

U.S. PATENT DOCUMENTS

| | | | |
|---|---|---|---|
| 2019/0149432 A1* | 5/2019 | Chang ................... | H04L 67/131 |
| | | | 715/753 |
| 2019/0265945 A1 | 8/2019 | Newell et al. | |
| 2020/0078688 A1* | 3/2020 | Kaethler ............... | A63F 13/795 |
| 2020/0265070 A1* | 8/2020 | Rapaport .............. | G06Q 10/10 |
| 2024/0361877 A1* | 10/2024 | Holz .................... | G06F 3/0346 |

* cited by examiner

Figure 3:
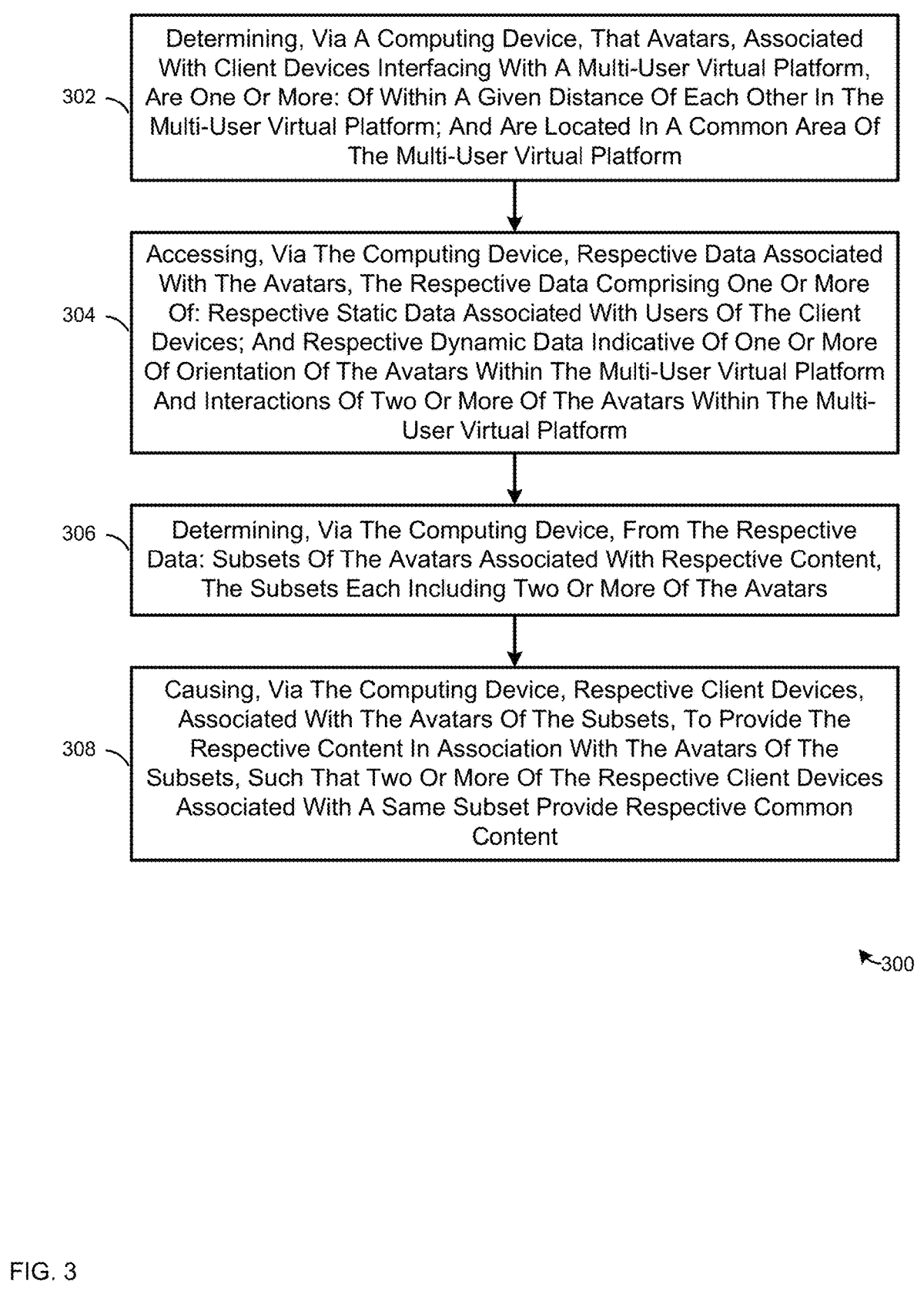

302 — Determining, Via A Computing Device, That Avatars, Associated With Client Devices Interfacing With A Multi-User Virtual Platform, Are One Or More: Of Within A Given Distance Of Each Other In The Multi-User Virtual Platform; And Are Located In A Common Area Of The Multi-User Virtual Platform 304 — Accessing, Via The Computing Device, Respective Data Associated With The Avatars, The Respective Data Comprising One Or More Of: Respective Static Data Associated With Users Of The Client Devices; And Respective Dynamic Data Indicative Of One Or More Of Orientation Of The Avatars Within The Multi-User Virtual Platform And Interactions Of Two Or More Of The Avatars Within The Multi-User Virtual Platform 306 — Determining, Via The Computing Device, From The Respective Data: Subsets Of The Avatars Associated With Respective Content, The Subsets Each Including Two Or More Of The Avatars 308 — Causing, Via The Computing Device, Respective Client Devices, Associated With The Avatars Of The Subsets, To Provide The Respective Content In Association With The Avatars Of The Subsets, Such That Two Or More Of The Respective Client Devices Associated With A Same Subset Provide Respective Common Content

DEVICE, SYSTEM, AND METHOD FOR MORE EFFICIENTLY CONTROLLING CLIENT DEVICES TO PROVIDE COMMON CONTENT

FIELD

The present specification relates generally to virtual reality client devices, and specifically to a device, system and method for more efficiently controlling client devices to provide common content.

BACKGROUND

Internet browsing began with the original hypertext markup language (HTML). HTML has iterated to its fifth version and continues to evolve. Elegant web browsing experiences are now commonplace, even on wireless mobile phones with small screens. With the correct equipment, virtual reality environments (which may include augmented environments, metaverse environments, and the like), are on the cusp of providing even richer experiences than offered by traditional browsing. Standard Internet speeds now offer commonplace real time communication amongst large groups of people. At the same time, Internet content is increasing in volume and changing rapidly. Enormous unresolved challenges are present in efficiently utilizing computing, processing and communication resources. For example, generating content for individual client devices is process-resource intensive.

SUMMARY

A first aspect of the present specification provides a method comprising: determining, via a computing device, that avatars, associated with client devices interfacing with a multi-user virtual platform, are one or more of: within a given distance of each other in the multi-user virtual platform; and located in a common area of the multi-user virtual platform; accessing, via the computing device, respective data associated with the avatars, the respective data comprising one or more of: respective static data associated with users of the client devices; and respective dynamic data indicative of one or more of orientation of the avatars within the multi-user virtual platform and interactions of two or more of the avatars within the multi-user virtual platform; determining, via the computing device, from the respective data: subsets of the avatars associated with respective content, the subsets each including two or more of the avatars; and causing, via the computing device, respective client devices, associated with the avatars of the subsets, to provide the respective content in association with the avatars of the subsets, such that two or more of the respective client devices associated with a same subset provide respective common content.

At the method of the first aspect, the respective static data may comprise one or more of: relationship data; geolocation data; interest data; and social media data.

At the method of the first aspect, the respective dynamic data indicative of the orientation of the avatars within the multi-user virtual platform may comprise one or more of: respective locations of the avatars within the multi-user virtual platform; respective head orientation of the avatars within the multi-user virtual platform; respective movement of the avatars within the multi-user virtual platform; and respective directions that the avatars are looking within the multi-user virtual platform.

At the method of the first aspect, the respective dynamic data indicative of the interactions of two or more of the avatars within the multi-user virtual platform may comprise one or more of: conversations between two or more of the avatars within the multi-user virtual platform; common movement of two or more of the avatars within the multi-user virtual platform; common actions of two or more of the avatars within the multi-user virtual platform; and accessing of common multimedia of two or more of the avatars within the multi-user virtual platform.

At the method of the first aspect, a number of the subsets may be limited to a given number, and the method of the first aspect may further comprise: distributing all of the avatars between the subsets.

The method of the first aspect may further comprise: assigning respective probability scores to the avatars being associated with the respective content of the subsets; and grouping the avatars into the subsets based on the respective probability scores.

The method of the first aspect may further comprise: assigning respective probability scores to the avatars being associated with the respective content of the subsets; and grouping the avatars into the subsets based on the respective probability scores being above a probability threshold.

At the method of the first aspect, a number of the subsets may be limited to a given number, a given subset may be dedicated to generic content, and the method may further comprise: assigning respective probability scores to the avatars being associated with respective content of the subsets; grouping the avatars into the subsets based on the respective probability scores being above one or more respective threshold probability scores; and when a given group of the avatars are associated with probability scores that are below the respective threshold probability scores, grouping the given group of the avatars into the given subset such that the respective client devices associated with the given subset of the avatars provide the generic content.

The method of the first aspect may further comprise: in response to an additional avatar one or more coming within the given distance of the avatars, and entering the common area, assigning the additional avatar to an existing subset based on one or more of associated static data and associated dynamic data; and causing a respective client device associated with the additional avatar to provide the respective content associated with the existing subset.

The method of the first aspect may further comprise: in response to an additional avatar one or more of coming within the given distance of the avatars, and entering the common area, comparing one or more of associated static data and associated dynamic data of the additional avatar with existing subsets to generate respective probabilities one or more of the associated static data and the associated dynamic data of the additional avatar being comparable to the existing subsets; and grouping the additional avatar to an existing subset having the highest respective probability.

A second aspect of the present specification provides a computing device comprising: a controller; and a computer-readable storage medium having stored thereon program instructions that, when executed by the controller, causes the controller to perform a set of operations comprising: determining that avatars, associated with client devices interfacing with a multi-user virtual platform, are one or more of: within a given distance of each other in the multi-user virtual platform; and located in a common area of the multi-user virtual platform; accessing respective data associated with the avatars, the respective data comprising one or more of: respective static data associated with users of the client devices; and respective dynamic data indicative of one or more of orientation of the avatars within the multi-user virtual platform and interactions of two or more of the avatars within the multi-user virtual platform; determining, from the respective data: subsets of the avatars associated with respective content, the subsets each including two or more of the avatars; and causing respective client devices, associated with the avatars of the subsets, to provide the respective content in association with the avatars of the subsets, such that two or more of the respective client devices associated with a same subset provide respective common content.

At the computing device of the second aspect, the respective static data may comprise one or more of: relationship data; geolocation data; interest data; and social media data.

At the computing device of the second aspect, the respective dynamic data indicative of the orientation of the avatars within the multi-user virtual platform may comprise one or more of: respective locations of the avatars within the multi-user virtual platform; respective head orientation of the avatars within the multi-user virtual platform; respective movement of the avatars within the multi-user virtual platform; and respective directions that the avatars are looking within the multi-user virtual platform.

At the computing device of the second aspect, the respective dynamic data indicative of the interactions of two or more of the avatars within the multi-user virtual platform may comprise one or more of: conversations between two or more of the avatars within the multi-user virtual platform; common movement of two or more of the avatars within the multi-user virtual platform; common actions of two or more of the avatars within the multi-user virtual platform; and accessing of common multimedia of two or more of the avatars within the multi-user virtual platform.

At the computing device of the second aspect, a number of the subsets may be limited to a given number, and the set operations may further comprise: distributing all of the avatars between the subsets.

At the computing device of the second aspect, the set of operations may further comprise: assigning respective probability scores to the avatars being associated with the respective content of the subsets; and grouping the avatars into the subsets based on the respective probability scores.

At the computing device of the second aspect, the set of operations may further comprise: assigning respective probability scores to the avatars being associated with the respective content of the subsets; and grouping the avatars into the subsets based on the respective probability scores being above a probability threshold.

At the computing device of the second aspect, a number of the subsets may be limited to a given number, a given subset may be dedicated to generic content, and the set of operations may further comprise: assigning respective probability scores to the avatars being associated with respective content of the subsets; grouping the avatars into the subsets based on the respective probability scores being above one or more respective threshold probability scores; and when a given group of the avatars are associated with probability scores that are below the respective threshold probability scores, grouping the given group of the avatars into the given subset such that the respective client devices associated with the given subset of the avatars provide the generic content.

At the computing device of the second aspect, the set of operations may further comprise: in response to an additional avatar one or more coming within the given distance of the avatars, and entering the common area, assigning the additional avatar to an existing subset based on one or more of associated static data and associated dynamic data; and causing a respective client device associated with the additional avatar to provide the respective content associated with the existing subset.

At the computing device of the second aspect, the set of operations may further comprise: in response to an additional avatar one or more of coming within the given distance of the avatars, and entering the common area, comparing one or more of associated static data and associated dynamic data of the additional avatar with existing subsets to generate respective probabilities one or more of the associated static data and the associated dynamic data of the additional avatar being comparable to the existing subsets; and grouping the additional avatar to an existing subset having the highest respective probability.

A third aspect of the present specification provides a non-transitory computer-readable storage medium having stored thereon program instructions that, when executed by a computing device, causes the computing device to perform a method comprising: determining that avatars, associated with client devices interfacing with a multi-user virtual platform, are one or more of: within a given distance of each other in the multi-user virtual platform; and located in a common area of the multi-user virtual platform; accessing respective data associated with the avatars, the respective data comprising one or more of: respective static data associated with users of the client devices; and respective dynamic data indicative of one or more of orientation of the avatars within the multi-user virtual platform and interactions of two or more of the avatars within the multi-user virtual platform; determining, from the respective data: subsets of the avatars associated with respective content, the subsets each including two or more of the avatars; and causing respective client devices, associated with the avatars of the subsets, to provide the respective content in association with the avatars of the subsets, such that two or more of the respective client devices associated with a same subset provide respective common content.

At the method of the third aspect, the respective static data may comprise one or more of: relationship data; geolocation data; interest data; and social media data.

At the method of the third aspect, the respective dynamic data indicative of the orientation of the avatars within the multi-user virtual platform may comprise one or more of: respective locations of the avatars within the multi-user virtual platform; respective head orientation of the avatars within the multi-user virtual platform; respective movement of the avatars within the multi-user virtual platform; and respective directions that the avatars are looking within the multi-user virtual platform.

At the method of the third aspect, the respective dynamic data indicative of the interactions of two or more of the avatars within the multi-user virtual platform may comprise one or more of: conversations between two or more of the avatars within the multi-user virtual platform; common movement of two or more of the avatars within the multi-user virtual platform; common actions of two or more of the avatars within the multi-user virtual platform; and accessing of common multimedia of two or more of the avatars within the multi-user virtual platform.

At the method of the third aspect, a number of the subsets may be limited to a given number, and the method of the third aspect may further comprise: distributing all of the avatars between the subsets.

The method of the third aspect may further comprise: assigning respective probability scores to the avatars being associated with the respective content of the subsets; and grouping the avatars into the subsets based on the respective probability scores.

The method of the third aspect may further comprise: assigning respective probability scores to the avatars being associated with the respective content of the subsets; and grouping the avatars into the subsets based on the respective probability scores being above a probability threshold.

At the method of the third aspect, a number of the subsets may be limited to a given number, a given subset may be dedicated to generic content, and the method may further comprise: assigning respective probability scores to the avatars being associated with respective content of the subsets; grouping the avatars into the subsets based on the respective probability scores being above one or more respective threshold probability scores; and when a given group of the avatars are associated with probability scores that are below the respective threshold probability scores, grouping the given group of the avatars into the given subset such that the respective client devices associated with the given subset of the avatars provide the generic content.

The method of the third aspect may further comprise: in response to an additional avatar one or more coming within the given distance of the avatars, and entering the common area, assigning the additional avatar to an existing subset based on one or more of associated static data and associated dynamic data; and causing a respective client device associated with the additional avatar to provide the respective content associated with the existing subset.

The method of the third aspect may further comprise: in response to an additional avatar one or more of coming within the given distance of the avatars, and entering the common area, comparing one or more of associated static data and associated dynamic data of the additional avatar with existing subsets to generate respective probabilities one or more of the associated static data and the associated dynamic data of the additional avatar being comparable to the existing subsets; and grouping the additional avatar to an existing subset having the highest respective probability.

BRIEF DESCRIPTIONS OF THE DRAWINGS

For a better understanding of the various examples described herein and to show more clearly how they may be carried into effect, reference will now be made, by way of example only, to the accompanying drawings in which:

FIG. 3 depicts a flowchart of a method for more efficiently controlling client devices to provide common content, according to non-limiting examples.

DETAILED DESCRIPTION

Internet browsing is rapidly becoming more complex with the introduction of multi-user virtual platforms, and the like. Such multi-user virtual platforms generally provide content to avatars being controlled by client devices. Certain environmental content may be static and/or common to the avatars, such as streets, buildings, sky, and the like, however, other content may be dynamic, and may be provided to all the avatars, or customized for individual avatars. However, providing same content to all the avatars, may result in respective client devices not being operated to interact with the content, whereas customizing content for all the individual avatars may be processing resource intensive. Furthermore, such content may be provided by many third party platforms, and may be provided to many multi-user virtual platforms, all of which are connected to by client devices, and hence determining which content to provide at the many multi-user virtual platforms, from the many third party platforms, may be processing resource intensive.

As such, provided herein is a device, system and method for more efficiently controlling client devices to provide common content, for example via a content optimization engine, which may optimize content for client devices interfacing with a multi-user virtual platform, for example according to static data and/or dynamic data 132 associated with users of client devices. Such client devices are understood to interface with a multi-user virtual platform to control respective avatars in the multi-user virtual platform.

In particular, the computing device, via the content optimization engine, may be configured to determine from the static data and/or dynamic data 132: subsets of the avatars associated with respective content, the subsets each including two or more of the avatars, and cause, respective client devices, associated with the avatars of the subsets, to provide the respective content in association with the avatars of the subsets, such that two or more of the respective client devices associated with a same subset provide respective common content. In this manner, content may be dynamically controlled for subsets of the avatars, rather than for all the avatars, or individual avatars, which may optimize use of processing resources at the multi-user virtual platform.

Figure 1:
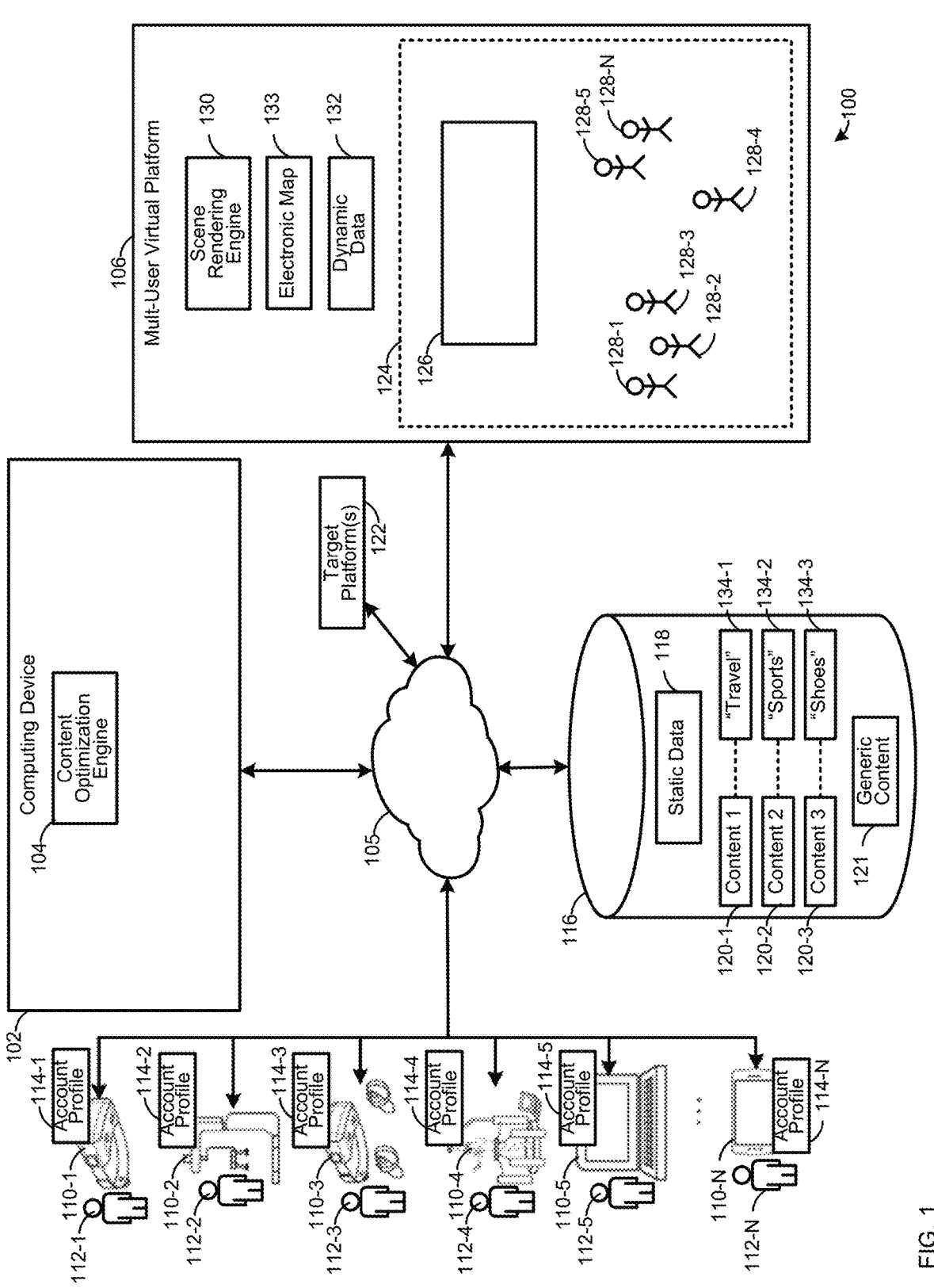
FIG. 1 depicts a system for more efficiently controlling client devices to provide common content, according to non-limiting examples.

FIG. 1 shows a system 100 more efficiently controlling client devices to provide common content. The system 100 comprises a computing device 102 implementing a content optimization engine 104, interchangeably referred to hereafter, for simplicity, as the engine 104.

The system 100 will hence be described with respect to engines, such as the engine 104. As used herein, the term "engine" refers to hardware (e.g., a processor, such as a central processing unit (CPU), graphics processing unit (GPU), an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), a PAL (programmable array logic), a PLA (programmable logic array), a PLD (programmable logic device), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

The components of the system 100 are generally in communication via communication links which are depicted in FIG. 1, and throughout the present specification, as double-ended arrows between respective components. The communication links include any suitable combination of wireless and/or wired communication networks and, similarly, the communication links may include any suitable combination of wireless and/or wired links.

In particular, as depicted, the components of the system 100 may be in communication with each other via a network 105, such as the Internet, and/or any other suitable combination of wired and/or wireless networks.

The system 100 further comprises a multi-user virtual platform 106.

The system 100 further comprises a plurality of client devices 110-1, 110-2, 110-3, 110-4, 110-5 . . . 110-N, interchangeably referred to hereafter, collectively, as the client devices 110 and, generically, as a client device 110. This convention will be used throughout the present specification. An "N" number of the client devices 110 may comprise as few as three client devices 110, and as many as tens, to hundreds to thousands of client devices 110.

Furthermore, as depicted, each client device 110 may be operated by a respective user 112-1, 112-2, 112-3, 112-4, 112-5 . . . 112-N (e.g. the users 112 and/or a user 112). Furthermore, as depicted, each client device 110 may be associated with and/or store a respective account profiles 114-1, 114-2, 114-3, 114-4, 114-5 . . . 114-N (e.g. the account profiles 114 and/or an account profile 114).

As depicted, the system 100 further comprises a memory 116 and stores static data 118 associated with the users 112 of the client devices 110. As depicted, the memory 116 further stores sets of content 120-1, 120-2, 120-3 (e.g. content 120 and/or a set of content 120). While only three sets of content 120 are depicted, the system 100 may comprise any suitable number of sets of content 120, but may more specifically comprise at least two sets of content 120. As depicted, the memory 116 further stores generic content 121.

As depicted, the system 100 further comprises at least one target platform 122 (interchangeably referred to hereafter as the target platform 122). The content 120 may be supplied and/or provided the target platform 122.

In general, the computing device 102, the engine 104, the virtual platform 106, the client devices 110, the memory 116, and the target platform 122 may be in communication via the network 105.

The computing device 102 may comprise any suitable combination of any suitable number of one or more servers, one or more cloud computing devices, and the like, and the engine 104 may be implemented accordingly, including, but not limited to a virtual machine implementation.

The virtual platform 106 may be based on any present or future electronic media servers that publish and/or provide content for the client devices 110. In particular, the virtual platform 106 may comprise augmented reality and/or virtual reality platforms which may provide augmented reality and/or virtual reality environments, such as "metaverse" environments. The virtual platform 106 may hence be alternatively referred to as a content platform, a content publishing platform, a publishing platform, and the like.

Furthermore, while only one virtual platform 106 is depicted, the system 100 may comprise any suitable number of virtual platforms 106, including tens, hundreds, thousands of virtual platforms 106, and/or any suitable number. Similarly, while only one target platform 122 is depicted, the system 100 may comprise any suitable number of target platforms 122, including tens, hundreds, thousands of target platforms 122, and/or any suitable number. As will be presently explained, the virtual platform 106 may provide primary content to the client devices 110, and the target platform 122 may provide secondary content that is provided to the virtual platform 106, which provides the secondary content to the client devices 110 in addition to the primary content.

The client devices 110 may comprise any suitable type of human-machine interface for interacting with the virtual platform 106. For example, the client devices 110 may include traditional laptop computers, desktop computers, mobile phones, tablet computers and any other device that may be used to receive content via the virtual platform 106 that complement the input components and output components associated with a given client device 110. It is contemplated that the client devices 110 may include virtual or augmented reality gear complementary to virtual environments (e.g. virtual reality and/or augmented reality and/or mixed reality environments) that may be offered by the virtual platform 106.

According to specific examples of FIG. 1, the client device 110-1 comprises a virtual reality headset; the client device 110-2 comprises a first virtual reality station comprising a headset with head, hand and feet tracking technology; the client device 110-3 comprises a virtual reality headset with haptic feedback hand controllers; the client device 110-4 comprises a second virtual reality station comprising a headset with hand, feet, and torso tracking and haptic feedback technology; the client device 110-5 comprises a traditional laptop computer and the client device 110-N comprises a traditional mobile telephone. Again, these are non-limiting examples, but their diversity of input components and output components is illustrative of the diverse human-machine interface aspects of the client devices of the present specification.

While as depicted an account profile 114 may be stored at a client device 110 operated by a respective user 112, an account profile 114 may be stored anywhere in the system 100 that is accessible to the computing device 102 and/or the engine 104, and/or any other suitable components of the system 100. For example, an account profile 114 may be stored at a memory and/or database, such as a central repository of account profiles, which may include, but is not limited to, the memory 116, and the like.

Furthermore, while the static data 118 may be particular to the virtual platform 106, and may store other data associated with the users 112 that is particular to the virtual platform 106, such as a history of interactions of users 112 with the virtual platform 106, and the like, the static data 118 may comprise one or more of the account profiles 114. Indeed, hereafter, reference to the static data 118 may include the account profiles 114, whether stored at the memory 116, and/or stored at a respective client device 110. In particular, the computing device 102, and/or the engine 104, is understood to have access to the static data 118 and/or the account profiles 114.

A given account profile 114 is further understood to be associated with a respective user 112, and not specifically a client device 110, so that a respective user 112 may operate any suitable client device 110, for example to log into and access an environment of a virtual platform 106 (e.g. via browser of a client device 110, and/or an application of a client device 110, and the like). It is further understood that the virtual platform 106 and/or the computing device 102 and/or the engine 104 and/or the target platform 122 (and/or any other suitable component of the system 100), may have access to the account profile 114 independent of the client device 110 used by the respective user 112. Nonetheless, a client device 110 and an account profile 114 may be referred to herein as being associated with each other, and/or at least temporarily associated with each other, at least by virtue of each of such a client device 110 and an account profile 114 being associated with a respective user 112.

Returning to the virtual platform 106, the virtual platform 106 may provide any suitable virtual environment 124, and the like, and may comprise a game virtual environment 124, a social media virtual environment, a marketplace virtual environment, and the like, amongst other possibilities.

The virtual platform 106 may generate primary content related to a functionality of the virtual environment 124, and may embed secondary content into the virtual environment 124. Such secondary content may be available from the target platform 122 and may be intended to divert a connection of a given client device 110 from the virtual platform 106 towards a specific target platform 122 that is associated with the secondary content. Hence, it is understood that the target platform 122 may be "targets" of diversions of client devices 110 from the virtual platform 106, and the system 100 may be generally configured to maximize such diversions.

As depicted, the memory 116 stores three examples of such secondary content, as the content 120. Put another way, the content 120 may comprise secondary content provided by the target platform 122, and hence the content 120, when provided in the virtual environment 124, for example in a (virtual) region 126, may be intended to divert a given client device 110 from the virtual platform 106 towards a specific target platform 122 that originated and/or provided the content 120, for example when the given client device 110 is operated to interact with the content 120 provided in the region 126. Hence, hereafter, the content 120 may be interchangeably referred to as secondary content 120.

For example, as depicted, respective avatars 128-1, 128-2, 128-3, 128-4, 128-5 . . . 128-N (e.g. the avatars 128 and/or an avatar 128) may be provided in the virtual environment 124, and the avatars 128 may be controlled by a respective client device 110 to interact with any content 120 provided at the region 126.

The term avatar, as used herein, may refer to any two-dimensional and/or three-dimensional representation of a respective user 112 in the virtual environment 124, and which may be controlled via a respective client device 110 to interact with primary content and secondary content of the virtual environment 124 provided by the virtual platform 106. Hence, for example, the avatar 128-1 may be controlled via the user 112-1 operating the client device 110-1, the avatar 128-2 may be controlled via the user 112-2 operating the client device 110-2, etc.

Primary content provided at the virtual environment 124 may include certain types of unchanging content, for example which may provide a geography of the virtual environment 124, such as streets, buildings, structures, sky, and the like, and which may include, but is not limited to, a position of the region 126, though some primary content may move within the geography of the virtual environment 124, such as birds, clouds, vehicles and the like. Such primary content may be provided to the respective client devices 110, for example as a respective avatar 128 moves in the virtual environment 124.

However, in some examples, the region 126 may be "attached" to a vehicle and may move. Regardless, content provided at the region 126, such as the content 120, may change and/or be dynamic, as described herein. For example, any of the content 120-1, 120-2, 120-3 may be provided at the region 126, and may change dynamically, to customize the region 126 for subsets of the avatars 128 as described herein.

As depicted, the virtual platform 106 may implement a scene rendering engine 130. The scene rendering engine 130 may render scenes of the virtual environment 124, which may comprise a two-dimensional and/or three-dimensional environment, including, but not limited to, any primary content and/or secondary content 120, the region 126, the avatars 128, and the like. Such scenes may include, but are not limited to, any suitable combination of visual and/or aural scenes to be provided at a client device 110. Such scenes may be two-dimensional or three-dimensional, depending on capability of a client device 110 for which the scenes are being rendered. In some examples, however, such scenes may be primarily and/or only aural using, for example descriptive video to explain non-depicted visual aspects of a scene (e.g., for visually impaired users 112). As the system 100 comprises a plurality of client devices 110, the scene rendering engine 130 may render respective scenes for the plurality of client devices 110.

Furthermore, as depicted, the virtual platform 106 may maintain dynamic data 132 indicative of locations and/or orientation and/or head orientation and/or movement, and the like, of the avatars 128 in the virtual environment 124, and/or relative to each other in the virtual environment 124. The dynamic data 132 may be further indicative of interactions between the avatars 128, such as aural and/or textual interactions and/or conversations therebetween, and/or "virtual" physical interactions therebetween (e.g. such as two or more avatars 128 shaking hands, and/or touching, etc.) and/or any other suitable interactions.

In a particular example, virtual geographic locations and/or regions of the virtual platform 106 may be defined by an electronic map 133. For example, the electronic map 133 may indicate different virtual geographic regions where different primary and secondary content may be accessed and/or viewed electronically at the virtual platform 106, for example via a client device 110 and/or a respective avatar 128. For example, the electronic map 133 may indicate different virtual features of the virtual platform 106, may be accessed electronically via a client device 110 and/or a respective avatar 128.

The nature of the virtual platform 106 and/or the target platform 122 is thus not particularly limited. Hence, very generally, the virtual platform 106 carries primary content for consumption by the client devices 110, and the virtual platform 106 also carries secondary content 120 for diverting traffic to the target platform 122, the secondary content 120 provided by the target platform 122.

The secondary content 120, as provided at the region 126, may comprise a link to the target platform 122, and the like, though the secondary content 120 may be provided in a format compatible with the visual and/or aural scenes of the virtual environment 124. In particular, the secondary content 120 may comprise one or more indications of goods and/or services for free and/or for sale, and/or any other suitable content available via the target platform 122.

It is understood that the computing device 102 and/or the engine 104 may intermediate between the virtual platform 106 and the target platform 122, to cause the virtual platform 106 to provide certain secondary content 120 at the virtual environment 124, which are provided to the client devices 110. Such intermediation further obviates the virtual platform 106 and the target platform 122 from negotiating amongst themselves. In particular, while only one virtual platform 106 and target platform 122 is depicted, and only six client devices 110 are depicted, when the system 100 comprises tens to hundreds to thousands of virtual platform 106 and/or target platform 122 and/or client devices 110, providing secondary content 120 may become challenging.

According to a specific illustrative example, the present specification may have particular application to the travel industry and thus may (but need not) be biased towards primary content of interest to the users 112 who are travelers, while certain secondary content 120 (e.g. the first content 120-1) may be more likely to include travel content including that are intended to direct traffic to a target platform 122 that may be operated by travel entities and sell travel services. Travel entities may broadly encompass different categories of all types of travel service offerings including transportation-entities; accommodation-entities and travel-destination entities. Transportation-entities may provide transportation services for the users 112, such as airlines, rental car agencies, rail services, ferries, and bus lines. Accommodation-entities may provide lodging for the users 112, such as hotels, vacation rentals, resorts and B&Bs ("Bed and Breakfasts"), including the lodging at the location where a user 112 arrives after receiving a transportation service. Travel-destination entities may include providers of activities at the location where a user 112 may lodge. Travel-destination entities may thus include, by way of non-limiting examples, restaurants, spas, concert venues, exhibition centers, summits, sporting event venues, fairs, conference venues, sporting arenas, museums, art galleries, tours and resort activity centers and the like.

Hence, according to the specific illustrative example, at least one target platform 122 may focus on content 120 of interest to travelers. In certain examples, at least one target platform 122 may reference transportation-entities and their sales workflows. Furthermore, at least one target platform 122 may also be associated with a travel entity which has connectivity to partners, thereby enabling the sale of a variety and/or bundle of goods and/or services, for example a transportation-actor which is able to sell its own flights together with services from accommodation-entities and travel-destination entities. Regardless, at least one target platform 122 may include an e-commerce environment including a sales workflow or interactive sales function for the client devices 110, representing a customer experience sales funnel, including experiences such as travel itinerary prediction and fulfillment as well as service searching, service browsing, adding a service to shopping cart, checkout, fare lock and temporary inventory holds to be provided for a fee, and payment processing.

However, the content 120 may comprise any suitable content and, as depicted, a set of content 120 is associated with a respective of indicator 134-1, 134-2, 134-3 (e.g. the indicators 134 and/or an indicator 134) of respective content 120. In particular, an indicator 134 may indicate a category of the respective content 120, for example of what kind of goods and/or services, amongst other possibilities, may be accessed via the respective content 120. An association between a set of content 120 and a respective indicator 134 is shown via a broken line therebetween.

For example, as depicted, a first set of content 120-1 (e.g. labelled "Content 1") may provide access to travel content (e.g. advertising and/or tickets for a particular airline, and/or travel company, and the like), as indicated by an associated first indicator 134-1 (e.g. labelled "Travel"). Similarly, a second set of content 120-2 (e.g. labelled "Content 2") may provide access to sports content (e.g. advertising and/or tickets for a particular sporting event), as indicated by an associated second indicator 134-2 (e.g. labelled "Sports"). Similarly, a third set of content 120-3 (e.g. labelled "Content 3") may provide access to content related to shoes (e.g. advertising and/or offers for shoes), as indicated by an associated third indicator 134-3 (e.g. labelled "Shoes").

Returning to the client devices 110, the client devices 110 may be based on any suitable client computing platform operated by the users 112 that may have an interest in the primary content being provided on the virtual platform 106 and/or the secondary content 120 being offered by the target platform 122.

Hence, a user 112, and an associated client device 110, may thus be associated with a respective account profile 114 as has previously been described.

A form of an account profile 114 is not particularly limited, and in a simple example, may be simply an alpha-numerical sequence that is unique in relation to other account profiles 114 (and/or other identifiers) of the system 100, such as a user identifier, and the like. An account profile 114 may also be more complex as they may be combinations of account credentials (e.g. user name, password, two-factor authentication token, etc.) that uniquely identify a given user 112. Account profiles 114 themselves may also be indexes that point to identifier objects, such as accounts associated with respective users 112. In particular, account profiles 114 may generally be uniquely identifiable within the system 100 in association with what they represent.

However, an account profile 114, and/or an account to which an account profile 114 is linked, may define preferences and/or a history of a respective user 112, which may indicate previous interactions of the respective user 112 with virtual environments, and the like, and which may include, but is not limited to, a browsing history of the respective user 112, for example across different virtual environments and/or different browsers and/or different client devices 110, and the like. In some examples, an account profile 114 may define relationships between a respective user 112 and one or more entities associated with the target platform 122, such as loyalty numbers, and the like, issued to the respective user 112 from one or more entities associated with the target platform 122. In some examples, an account profile 114 may define relationships between a respective user 112 and other users 112, such as indications of friendships and/or family relationships and/or romantic relationships therebetween, and the like. In some examples, an account profile 114 may define interests of respective users 112 such as hobbies, sports, club memberships (e.g. in the real world and/or at a virtual platform which may include, but is not limited to, the virtual platform 106) and the like. In some examples, an account profile 114 may further comprise social media posts of users 112, for example on social media platforms (which may include, but is not limited to, the virtual platform 106), and the like.

The users 112 may typically be individuals but may alternatively, and/or in addition, be corporate entities, and such users 112 may interact, via respective client devices 110, with both the virtual platform 106 as well as the target platform 122. Each account profile 114 may be used by other components of the system 100, including the virtual platform 106, the target platform 122 and the engine 104 to track, amongst other possibilities: traffic flows between a given client device 110 and the virtual platform 106 (and/or other virtual platforms), including, but not limited to, interactions with primary and/or secondary content; traffic flows between a given client device 110 and target platform 122, including, but not limited to, selections and/or purchases made via the target platform(s) 122; diversions of traffic originated by a given client device 110 from a given virtual platform 106 to respective target platform 122; travel-itinerary fulfillments arising from selection of secondary content provided via the virtual platform 106 (e.g. returning to the aforementioned travel-industry example); and the like.

In particular, the account profiles 114 and/or the static data 118 may comprise one or more of relationship data, geolocation data, interest data, social media data, and the like, associated with the users 112, for example within the virtual platform 106 and/or the virtual environment 124 and/or any other suitable platform and/or content platform.

For example, relationship data may indicate relationships between the users 112 and/or their respective avatars 128, and may indicate that certain users 112 are friends and/or cohabitate and/or married and/or otherwise in a relationship with each other. The relationship data may alternatively, and/or in addition, indicate groups and/or clubs to which the users 112 and/or their respective avatars 128 belong, for example within the virtual platform 106 and/or the virtual environment 124, other suitable platforms and/or content platforms, and/or in the real world.

Similarly, geolocation data may indicate that certain users 112 are collocated and hence may be relatives and/or friends, and the like.

Similarly, interest data may indicate respective interests of the users 112. For example interest data may indicate interests of the users 112, and/or groups and/or clubs to which the users 112 and/or their respective avatars 128 belong, for example within the virtual platform 106 and/or the virtual environment 124, other suitable platforms and/or content platforms, and/or in the real world.

Similarly, social media data may indicate relationships between the users 112 and/or their respective avatars 128, and/may indicate groups and/or clubs to which the users 112 and/or their respective avatars 128 belong, for example on social media platforms, and the like. Similar to the interest data, the social media data may further indicate respective interests of the users 112.

Hence, the static data 118 may comprise any suitable data, and may be respective to individual users 112.

As will be explained herein, one or more of the static data 118 and the dynamic data 132 may be used to determine subsets of the avatars 128 associated with respective content 120, the subsets each including two or more of the avatars 128. For example, the avatars 128 may be grouped into subsets according to their common interests, and/or grouped into subsets according to their interactions, amongst other possibilities. Furthermore, the computing device 102 may cause respective client devices 110, associated with the avatars 128 of the subsets, to provide the respective content

120 (e.g. at the region 126) in association with the avatars 128 of the subsets, such that two or more of the respective client devices 110 associated with a same subset provide respective common content 120.

For example, a first subset of two or more of the avatars 128, who may be interested in travel, as indicated by the static data 118, may be selected and provided with the first set of content 120-1 at the region 126, for example as the first indicator 134-1 indicates that the first set of content 120-1 is associated with travel.

Similarly, a second subset of two or more of the avatars 128, who may be interested in sports, as indicated by the static data 118, may be selected and provided with the second set of content 120-2 at the region 126, for example as the second indicator 134-2 indicates that the second set of content 120-2 is associated with sports.

Similarly, a third subset of two or more of the avatars 128, who may be interested in shoes, as indicated by the static data 118, may be selected and provided with the third set of content 120-3 at the region 126, for example as the third indicator 134-3 indicates that the third set of content 120-3 is associated with shoes.

In another example, two subsets of two or more of the avatars 128 may be "walking" in a "mall" provided in the virtual environment 124, and the region 126 may comprise a virtual shoe store and/or be located in a virtual shoe store. In these examples, the static data 118 and/or the account profiles 114 may indicate that a first subset of two or more of the avatars 128 are interested in a first category of shoes, and the static data 118 may further indicate that a second subset of two or more of the avatars 128 are interested in a second category of shoes different from the first category. For simplicity, the first and second category may comprise men's shoes and women's shoes.

In these examples, as the region 126 may be located in a virtual shoe store, and the like, the region 126 may be dedicated to providing the third set of content 120-3, and the subsets of the avatars 128 that are determined may be selected based on available content 120 of the third set of content 120-3, and according to the static data 118 and/or the account profiles 114. For example, a portion of the third set of content 120-3 may be particular to men's shoes and another portion of the third set of content 120-3 may be particular to women's shoes. As such, the first subset of the avatars 128 may be selected according to a respective interest in men's shoes, and the second subset of the avatars 128 may be selected according to a respective interest in women's shoes.

Hence, at the region 126, the first subset of the avatars 128 may be provided with that portion of the third set of content 120-3 particular to men's shoes, and the second subset of the avatars 128 may be provided, at the region 126, with that portion of the third set of content 120-3 particular to women's shoes. Indeed, in these examples, the content 120-3 provided at the region 126 may comprise three-dimensional representations of the men's shoes and the women's shoes.

Such dynamic selection if the subsets of the avatars 128 may be even more particular.

For example, of the first subset of avatars 128 associated with an interest in men's shoes, the first subset may be divided into further subsets according to respective further associated interests of the first subset of avatars 128, as indicated by the static data 118 and/or the account profiles 114, as well, types of men's shoes available at the third set of content 120-3. For example, a first further subset of the first subset of the avatars 128 associated with an interest in basketball may be provided, at the region 126, with a portion of the third set of content 120-3 particular to men's basketball shoes, and a second further subset of the first subset of the avatars 128 associated with an interest in golf may be provided, at the region 126, with a portion of the third set of content 120-3 particular to men's golf shoes.

Similarly, of the second subset of avatars 128 associated with an interest in women's shoes, the second subset may be divided into further subsets according to respective further associated interests of the second subset of avatars 128, as indicated by the static data 118 and/or the account profiles 114, as well, types of women's shoes available at the third set of content 120-3. For example, a first further subset of the second subset of the avatars 128 associated with an interest in running may be provided, at the region 126, with a portion of the third set of content 120-3 particular to women's running shoes, and a second further subset of the second subset of the avatars 128 associated with an interest in weightlifting may be provided, at the region 126, with a portion of the third set of content 120-3 particular to women's weightlifting shoes.

In such a manner, the subsets of the avatars 128 may be dynamically selected, and the content 120 provided at the region 126 may be dynamically provided according to common interests associated with the subsets of the avatars 128.

As depicted, the memory 116 further stores the generic content 121. Such generic content 121 may be similar to any of the content 120, or different from the content 120, and may represent any suitable secondary content that may be provided at the region 126 under certain conditions described herein. For example, when no common interests are determined to be associated with a subset of avatars 128, and/or when none of the content 120 is determined to be associated with a subset of avatars 128, the generic content 121 may be provided to such a subset of avatars 128 at the region 126.

Having described an overview of system 100, hardware infrastructure of certain components of the system 100 will next be described. In particular, FIG. 2 depicts a schematic diagram of a non-limiting example of internal components of the computing device 102.

Figure 2:
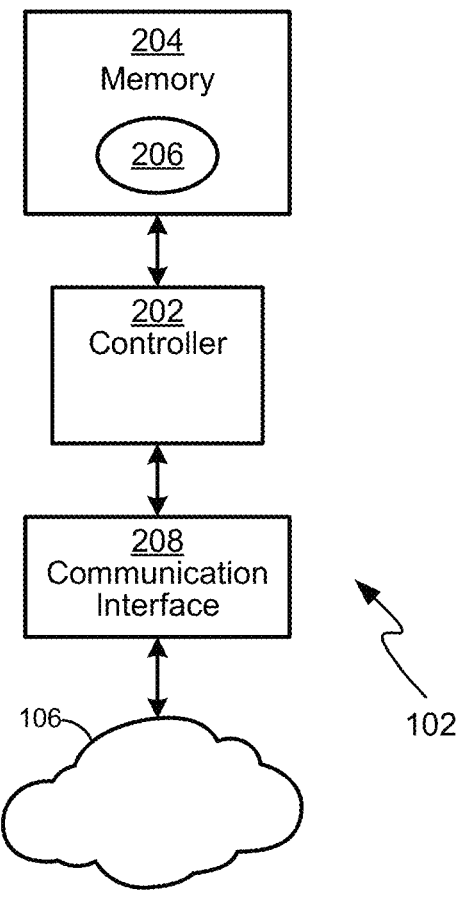
FIG. 2 depicts a computing device for more efficiently controlling client devices to provide common content, according to non-limiting examples.

Attention is next directed to FIG. 2 which depicts details of the computing device 102. The computing device 102 may comprise one or more computing devices, and/or one or more servers and/or one or more cloud computing devices, and the like. Alternatively, and/or in addition, the computing device 102 may comprise one or more personal computers and/or one or more laptops, and/or any other suitable computing device.

In the depicted example of FIG. 2, the computing device 102 includes at least one controller 202 interconnected with a memory 204, storing an application 206, and a communication interface 208.

The controller 202 may be implemented as a plurality of processors or one or more multi-core processors and/or may include one or more central processing units (CPUs). The controller 202 be configured to execute different programing instructions, as described herein.

The memory 204 may include any suitable combination of non-volatile and volatile memories. A non-volatile memory, of the memory 204, may be based on any persistent memory technology, such as an Erasable Electronic Programmable Read Only Memory ("EEPROM"), flash memory, solid-state hard disk (SSD), other type of hard-disk, or combinations of them. Hence, a non-volatile memory, of the memory 204, may also be described as a non-transitory computer readable media.

A volatile memory, of the memory 204, may be based on any random access memory (RAM) technology. For example, volatile memory, of the memory 204, may be based on a Double Data Rate (DDR) Synchronous Dynamic Random-Access Memory (SDRAM).

Other types of non-volatile and/or volatile memory are contemplated and/or may be provided.

The controller 202 and the memory 204 may be generally comprised of one or more integrated circuits (ICs).

The controller 202 is also interconnected with the communication interface 208, which enables the computing device 102 to communicate with the other components of the system 100, for example (as depicted) via the network 105. The communication interface 208 therefore may include any suitable components (e.g. network interface controllers (NICs), radio units, and the like) to communicate via any suitable network. The specific components of the communication interface 208 may be selected based upon the nature of the network 105 used to communicate, and/or local communication between components of the system 100, and the like.

While not depicted in FIG. 2, the computing device 102 may also include input and output components connected to the controller 202, such as keyboards, mice, display components (e.g. display screens), and the like (not shown).

The components of the computing device 102 mentioned above may be deployed in a single enclosure, or in a distributed format. In some examples, therefore, the computing device 102 may include a plurality of controllers and/or processors, either sharing the memory 204 and the communication interface 208, or having distinct associated memories and communication interfaces. As such, it is understood that the memory 204 and/or a portion of the memory 204 may be internal (e.g. as depicted) or external to the computing device 102; regardless, the controller 202 is understood to have access to the memory 204.

The memory 204 also stores computer-readable programming instructions, executable by the controller 202, in the form of various applications, including the application 206. As will be understood by those skilled in the art, the controller 202 executes the instructions of the application 206 (and any other suitable applications) in order to perform various actions defined by the instructions contained therein including, but not limited to, implementing the engine 104 and/or the blocks of a method described with respect to FIG. 3. In the description below, the controller 202, and more generally the computing device 102, and/or the engine 104, are understood to be configured to perform those actions. It will be understood that they are so configured via the execution (by the controller 202) of the instructions of the applications stored in memory 204.

The infrastructure of the computing device 102, or a variant thereon, can be used to implement any of the computing components of the system 100, including, but not limited to, the platforms 106, 122. Furthermore, the computing device 102 and the platforms 106, 122 may also be implemented as virtual machines and/or with mirror images to provide load balancing. Functions of the computing device 102 may also be distributed amongst different platforms 106, 122, thereby obviating the need for a central comparing device 102 and/or engine 104.

Furthermore, it is understood that the core components of the controller 202, the memory 204, and the communication interface 208, as described in relation to the computing device 102, have analogues in the different form factors of client machines such as those that can be used to implement the client devices 110. The client devices 110 may be based on any of the client devices 110 described herein, and the like, may include any suitable augmented reality and/or virtual reality human-machine interfaces (HMIs) and/or hardware interfaces including, but not limited to, any suitable combination of input devices and output components (e.g. such as keyboards, pointing devices, touch devices, display components, haptic devices, and the like).

Attention is now directed to FIG. 3 which depicts a flowchart representative of a method 300 more efficiently controlling client devices to provide common content, such as the client device 110. The operations of the method 300 of FIG. 3 correspond to machine readable instructions that are executed by the computing device 102, and specifically the controller 202. In the illustrated example, the instructions represented by the blocks of FIG. 3 are stored at the memory 204 for example, as the application 206. The method 300 of FIG. 3 is one way in which the controller 202 and/or the computing device 102 and/or the system 100 may be configured. Furthermore, the following discussion of the method 300 of FIG. 3 will lead to a further understanding of the system 100, and its various components.

Put another way, the computing device 102 may comprise the controller 202 and the memory 204 storing instructions executable on the controller 202, to cause the controller 202 to implement the blocks of the method 300.

The method 300 of FIG. 3 need not be performed in the exact sequence as shown, or with certain blocks omitted, performed in parallel or in a different order than shown. Accordingly, the elements of method 300 are referred to herein as "blocks" rather than "steps." The method 300 of FIG. 3 may be implemented on variations of the system 100, as well.

It is furthermore understood that aspects of the method 300 will be described with respect to certain distances, directions, and the like, in the virtual environment 124 provided by the virtual platform 106. It is understood that such distances, directions, and the like are virtual distances, virtual directions, and the like, commensurate with a virtual geography of the virtual environment 124. Hence, for example, a reference to a distance in feet or meters, and the like, is understood to be a reference to virtual feet or virtual meters within a virtual geography of the virtual environment 124. However, such distances may be provided in any suitable unit of measurement compatible with the virtual environment 124, including, but not limited to pixels, and the like.

It is furthermore understood that aspects of the method 300 will be described with respect to certain features and/or structures, and the like, in the virtual environment 124 provided by the virtual platform 106. It is understood that such features and/or structures like are features and/or structures, and the like, commensurate with a virtual geography of the virtual environment 124. Hence, for example, a reference to a pub and/or a stadium of the virtual environment 124, and the like, is understood to be a reference to a virtual pub and/or a virtual stadium at which the avatars 128 may be located in the virtual environment 124. Similarly, a reference to a display screen, a table, and the like, of the virtual environment 124, and the like, is understood to be a reference to a virtual display screen, a virtual table, and the like, with which the avatars 128 may interact in the virtual environment 124

It is furthermore understood that aspects of the method 300 will be described with respect to the avatars 128 "seeing" and/or "hearing" and/or interacting with certain features of the virtual environment 124 provided by the virtual platform 106. It is understood that such seeing and/or hearing and/or interacting may comprise such features being virtually viewable and/or virtually hearable and/or virtually interactable with by the avatars 128 in a virtual geography of the virtual environment 124. Hence, for example, an avatar 128 "seeing" a display screen in a virtual pub and/or virtual stadium, and the like, is understood to be a reference to the display screen being viewable via a respective output component (e.g. a display component) of a client device 110, for example in scene rendering data generated by the scene rendering engine 130 that represents a view of the virtual environment 124 "seen" by the avatar 128.

Furthermore, it is understood that the method 300 may be implemented, at least in part, by way of the controller 202 and/or the computing device 102 implementing the content optimization engine 104.

At a block 302, the controller 202 and/or the computing device 102, determines that avatars 128, associated with client devices 110 interfacing with a multi-user virtual platform 106, are one or more: of within a given distance of each other in the multi-user virtual platform 106; and are located in a common area of the multi-user virtual platform 106.

For example, the given distance may be provided in units associated with the virtual environment 124 (e.g. feet, meters, pixels, and the like, amongst other possibilities). For example, the given distance may comprise 5 meters, 10 meters, 25 meters, and the like, amongst other possibilities, and/or the equivalent in feet, pixels, and the like.

Furthermore, such a given distance may comprise any suitable distance where all the avatars 128 may "view" the region 126 at a same time, and hence the given distance may depend on a size of the region 126 and sightlines for the region 126. For example, the region 126 may be viewable by the avatars 128 from certain locations in the virtual environment 124, but not other locations, and the given distance may include such locations where the region 126 is viewable, and exclude locations where the region 126 is not viewable. Indeed, in some examples, the given distance may include a plurality of given distances that encompass a given area where the region 126 is viewable and excludes locations where the region 126 is not viewable.

For example, the region 126 may be located in a "pub" of the virtual environment 124, and the region 126 may comprise a display screen in the pub. In these examples, the given distance may encompass regions in the pub where the region 126 (e.g. the display screen) is viewable.

The common area may be provided in terms of a common room and/or a common structure in which the avatars 128 are located. For example, the avatars 128 may be located in a pub and/or a stadium of the virtual environment 124.

To determine whether the avatars 128 are within a given distance of each other in the multi-user virtual platform 106 and/or are located in a common area of the multi-user virtual platform 106, the controller 202 and/or the computing device 102 is understood to at least have access to locations of the avatars 128 within the virtual environment 124, and may further have access to the electronic map 133 of the virtual environment 124 indicative of where common areas of the virtual environment 124 are located. For example, the electronic map 133 may be requested from the virtual platform 106 by the controller 202 and/or the computing device 102 and/or the electronic map 133 may be stored at the memory 116 accessible to the controller 202 and/or the computing device 102.

In examples where the controller 202 and/or the computing device 102 determines whether the avatars 128 associated with the client devices 110 are within a given distance of each other in the multi-user virtual platform 106, the controller 202 and/or the computing device 102 may receive and/or request locations of the avatars 128 within the virtual environment 124 from the multi-user virtual platform 106, and compare differences between their locations to the given distance, and determine that the avatars 128 are within the given distance from each other when differences between their locations are less than the given distance.

However, the locations of the avatars 128 may be determined in any suitable manner. For example, the controller 202 and/or the computing device 102 may have access to the dynamic data 132 indicative of the locations of the avatars 128 within the virtual environment 124. Alternatively, or in addition, the computing device 102 may be dynamically and/or periodically notified of locations of the avatars 128, within the virtual environment 124, by the virtual platform 106.

In examples where the controller 202 and/or the computing device 102 determines whether the avatars 128 associated with the client devices 110 are located in a common area of the multi-user virtual platform 106, the controller 202 and/or the computing device 102 may determine the locations of avatars 128 in any suitable manner and compare the locations to the electronic map 133. When the locations of avatars 128 are in a common area, such a virtual pub, a virtual stadium, and the like, as indicated by the electronic map 133, the controller 202 and/or the computing device 102 determines that the avatars 128 associated with the client devices 110 are located in such a common area.

In other examples, where the controller 202 and/or the computing device 102 determines whether the avatars 128 associated with the client devices 110 are located in a common area of the multi-user virtual platform 106, the controller 202 and/or the computing device 102 may be dynamically and/or periodically notified, by the virtual platform 106, of avatars 128 (e.g. and their respective locations) that are located within a common area of the virtual environment 124.

Indeed, it should by now be apparent that any suitable process of the controller 202 and/or the computing device 102 determining whether avatars 128 that are within a given distance in of the virtual environment 124, and/or are located in a common area of the virtual environment 124, is within the scope of the present specification.

In examples that include a given distance, the controller 202 and/or the computing device 102 may determine the locations of the avatars 128 relative to each other, for example and which are also proximal to the region 126, and determine that the method 300 is to continue for any avatars 128 that are within the given distance.

In examples that include a common area, the controller 202 and/or the computing device 102 may determine the locations of the avatars 128 relative to an electronic map and determine that the method 300 is to continue for any avatars 128 that are within the common area as indicated by the electronic map 133.

At a block 304, the controller 202 and/or the computing device 102 accesses respective data associated with the avatars 128, the respective data comprising one or more of: respective static data 118 associated with users 112 of the client devices 110; and respective dynamic data 132 indicative of one or more of orientation of the avatars 128 within the multi-user virtual platform 106 and interactions of two or more of the avatars 128 within the multi-user virtual platform 106.

For example, upon login by a client device 110 to the virtual platform 106, a respective account profile 114 may be provided by the client device 110 to the virtual platform 106 and optionally stored at the static data 118. Alternatively, or in addition, the respective account profile 114 may already be stored at the static data 118, for example in a previous login by the client device 110 to the virtual platform 106. Furthermore, respective static data 118 associated with a user 112 and/or a client device 110 may be indicated by an associated user identifier of an account profile 114.

Furthermore, upon login by a client device 110 to the virtual platform 106, the virtual platform 106 may maintain respective dynamic data 132 indicative of movement, orientation and/or interactions of an avatar 128 associated with the client device 110 in the virtual environment 124. Furthermore, respective dynamic data 132 associated with a user 112 and/or a client device 110 may be indicated by an associated user identifier of an account profile 114.

The controller 202 and/or the computing device 102 may access the static data 118 and/or the dynamic data 132 by requesting the static data 118 and/or the dynamic data 132 from a client device 110 (e.g. a request of an account profile 114), the memory 116 (e.g. the static data 118), and/or the virtual platform 106 (e.g. the dynamic data 132). Furthermore, the controller 202 and/or the computing device 102 may be notified of logins of client devices 110 to the virtual platform 106, for example by receiving a user identifier in a notification of such a login, and such notifications may be received from the virtual platform 106 and/or the client devices 110. The controller 202 and/or the computing device 102 may access the static data 118 and/or the dynamic data 132 accordingly using user identifiers received in such notifications.

At a block 306, the controller 202 and/or the computing device 102, determines, from the respective data: subsets of the avatars 128 associated with respective content 120, the subsets each including two or more of the avatars 128.

Some details of the block 304 and the block 306 are next described. In particular, examples of determining subsets of the avatars 128 from the respective static data 118 and the respective dynamic data 132 are described.

In general, the controller 202 and/or the computing device 102 may determine the subsets of the avatars 128 in any suitable manner including, but not limited to, using one or more programmatic algorithms and/or one or more machine learning algorithms. For example, the content optimization engine 104 may be specifically configured to determine such subsets, and may comprise one or more programmatic algorithms and/or one or more machine learning algorithms that receive the static data 118, the dynamic data 132 and one or more of the content 120 and the indicators 134 as input, and output the subsets of the avatars 128. Such an example assumes that one or more of static data 113, the dynamic data 132 identifies the avatars 128.

In some examples, the content optimization engine 104 (and/or the controller 202 and/or the computing device 102) may determine such subsets by grouping avatars 128 into the subsets based on relationships and/or interests identified in the static data 118 and/or locations, orientations, interactions identified in the dynamic data 132, and compare such groups to the content 120 and/or the indicators 134 to determine which of the subsets best "match" a given set of content 120.

Alternatively, and/or in addition, the content optimization engine 104 (and/or the controller 202 and/or the computing device 102) may determine such subsets by comparing the content 120 and/or the indicators 134 to interests of avatars 128 identified in the static data 118, and the like, and place a given avatar 128 into a subset associated with a given set of content 120 when a best "match" is found.

Hence, the content optimization engine 104 (and/or the controller 202 and/or the computing device 102) may determine the subsets of the avatars 128 in any suitable manner, attempting to match subsets of the avatars with respective content 120, and/or attempting to match respective content 120 to individual avatars 128, and the like.

Regardless, the content optimization engine 104 (and/or the controller 202 and/or the computing device 102) may output lists of identifiers of the avatars 128 in each respective subset, and identifiers of an associated set of content 120 that have been matched to the subset (or vice versa).

When a machine learning algorithm is used to generate the subsets, such a machine learning algorithm may output a respective score for each combination of a subset of the avatars 128 and associated content 120. The respective score may represent a probability that the subset of the avatars 128 and associated content 120 are accurately matched. Such a score may be between "0" and "100" indicating the accuracy, and the like, of a match, with "0" indicating no match and/or lowest accuracy and/or a lowest probability, and "100" indicating a perfect match, and/or highest accuracy and/or a highest probability. Hence, such scores may alternatively be referred to as probability scores, and the like.

Use of the static data 118 and the dynamic data 132 to determine subsets of the avatars 128 is next described.

As previously described, the respective static data 118 may comprise one or more of:

Relationship data, which may indicate relationships between the users 112 and/or their respective avatars 128. Hence, a subset of the avatars 128 may be selected when such relationship data indicates associated users 112 are friends and/or are in relationships in real life.

Geolocation data, which may indicate locations of the users 112 which may further indicate relationships between the users 112. For example, two or more users 112 being collocated may indicate that the two or more users 112 are in a same household, and/or are friends, and the like. Hence, a subset of the avatars 128 may be selected when such geolocation data indicates associated users 112 are collocated.

Interest data, which may indicate respective interests of the users 112. Hence, a subset of the avatars 128 may be selected when such interest data indicates associated users 112 have common interests.

Social media data, which may indicate relationships between the users 112 and/or their respective avatars 128, and/or interests of the users 112, for example as indicated on social media platforms, and the like. The social media data may hence comprise respective social media posts, and the like, of the users 112. In some examples, a subset of the avatars 128 may be selected when such social media data indicates associated users 112 have relationships and/or have common interests, as indicated by social media posts, and the like.

However, the respective static data 118 may comprise any suitable static data 118 associated with users 112 of the client devices 110. The respective static data 118 may hence be used to select subsets of avatars 128, for example according to common interests, and the like, and/or according to relationships, and the like, as described herein.

The respective dynamic data 132 indicative of the orientation of the avatars 128 within the multi-user virtual platform may comprise one or more of:

Respective locations of the avatars 128 within the multi-user virtual platform 106. For example, the respective locations of the avatars 128 may indicate whether or not respective avatars 128 are within the given distance from each other and/or whether or not the respective avatars 128 are located in a common area. However, the respective locations of the avatars 128 may also be used to determine a subset avatars 128. For example, for avatars 128 within the given distance and/or in the common area, different subsets of the avatars 128 may be grouped according to their respective locations. Using the aforementioned pub example, one subset of avatars 128 may be "seated" at one table, and a different subset of the avatars 128 may be seated at another table, as indicated by their respective locations.

Respective head orientation of the avatars 128 within the multi-user virtual platform 106. For example, such head orientations may indicate whether avatars 128 are interacting with each other, and such avatars 128 may be grouped accordingly. For example, two (or more) avatars 128 may be "looking" at each other as indicated by their head orientation which may indicate an interaction therebetween and such avatars 128 may be grouped into a subset.

Respective movement of the avatars 128 within the multi-user virtual platform 106. For example, as locations of the avatars 128 change, such changes of locations may indicate movement of the avatars 128, and one or more portions of the avatars 128 may be moving in tandem with each other. Such one or more portions of the avatars 128 moving in tandem may be grouped together in respective subsets.

Respective directions that the avatars 128 are looking within the multi-user virtual platform 106. Similar to head orientation, respective directions that the avatars 128 are looking may indicate that a subset of the avatars 128 are looking in a same direction and/or at a same feature of the virtual environment 124 which may indicate a common interest. For example, while not depicted, the virtual environment 124 may comprise static content advertising tourism (e.g. not at the region 126), and avatars 128 looking at such static content may be grouped together in a subset (e.g. associated with travel).

Hence, put another way, the respective dynamic data 132 indicative of the interactions of two or more of the avatars 128 within the multi-user virtual platform 106, may comprise one or more of: conversations between two or more of the avatars 128 within the multi-user virtual platform 106; common movement of two or more of the avatars 128 within the multi-user virtual platform 106; common actions (e.g. moving in tandem, looking in a same direction) of two or more of the avatars 128 within the multi-user virtual platform 106; and accessing of common multimedia of two or more of the avatars 128 within the multi-user virtual platform 106.

The last feature of accessing of common multimedia of two or more of the avatars 128 within the multi-user virtual platform 106 may comprise two or more of the avatars 128 watching a same sports game and/or a same video, and/or listening to same music, and the like, within the multi-user virtual platform 106. For example, the virtual environment 124, in addition to the region 126, may be providing certain content, which may comprise primary or secondary content, that includes certain multimedia. For example, when the multi-user virtual platform 106 comprises a virtual stadium, a sporting event may be provided at the virtual stadium, and two or more of the avatars 128 may be watching the sporting event.

The respective dynamic data 132 indicative of the interactions of two or more of avatars 128 within the multi-user virtual platform 106 may comprise one or more of:

Verbal and/or audio conversations between two or more of the avatars 128, for example where voice data of the verbal and/or audio conversations is received from suitable input components (e.g. microphones) of associated client devices 110. For example, two or more of the avatars 128 (e.g. the users 112) may be talking about sports, and such avatars 128 may be grouped together in a subset (e.g. associated with sports).

Textual exchanges between two or more of the avatars 128, for example where text data of the textual conversations is received from suitable input components (e.g. keyboards) of associated client devices 110. For example, two or more of the avatars 128 (e.g. the users 112) may be texting about shoes, and such avatars 128 may be grouped together in a subset (e.g. associated with shoes). In some examples, the textual exchanges may comprise text transcripts of the verbal and/or audio conversations; for example, the virtual platform 106 may be configured to convert verbal and/or audio conversations into text and/or text transcripts.

However, the respective dynamic data 132 may comprise any suitable respective dynamic data 132 associated with users 112 of the client devices 110.

Furthermore, subsets of the avatars 128 within the given distance and/or the common area may be determined in any suitable manner.

In some of these examples, a weighting scheme may be used. For example avatars 128 associated with a common interest (e.g. determined in any suitable manner) may have a higher weight than avatars 128 grouped together according to their respective locations. Continuing with the avatars 128 seated at various tables in a pub example, avatars 128 associated with a common interest but seated at different tables may be determined to belong to a same subset.

Furthermore, subsets of the avatars 128 are generally understood to be determined according to the content 120. For example, the controller 202 and/or the computing device 102 may determine that a subset of the avatars 128, for example which have a common interest of travel and/or a common interest related to travel (e.g. such tourism), may be associated with the first set of the content 120-1.

Similarly, the controller 202 and/or the computing device 102 may determine that another subset of the avatars 128, for example which have a common interest of sports and/or a common interest related to sports (e.g. stores that sell sports memorabilia), may be associated with the second set of the content 120-2.

Similarly, the controller 202 and/or the computing device 102 may determine that another subset of the avatars 128, for example which have a common interest of shoes and/or a common interest related to shoes (e.g. such as medical problems related to feet), may be associated with the third set of the content 120-4.

At a block 308, the controller 202 and/or the computing device 102, causes respective client devices 110, associated with the avatars 128 of the subsets, to provide the respective content 120 in association with the avatars 128 of the subsets, such that two or more of the respective client devices 110 associated with a same subset provide respective common content 120.

Put another way, subsets of the avatars 128 may be determined in any suitable manner, associated with respective content 120, and all the respective client devices 110 associated with a same subset of the avatars 128 are controlled to provide the associated content 120.

Hence, for example, all avatars 128 of a subset having a common interest in sports, and the like, may view the first set of content 120-1 associated with travel (e.g. as indicated by the indicator 134-1) at the region 126 and hence an output component of the associated client devices 110 output scenes (e.g. rendered by the scene rendering engine 130) that include the region 126 providing the first set of content 120-1 associated with travel.

In contrast, all avatars 128 of a subset having a common interest in sports, and the like, may view the second set of content 120-2 associated with sports (e.g. as indicated by the indicator 134-2) at the region 126 and hence an output component of the associated client devices 110 output scenes (e.g. rendered by the scene rendering engine 130) that include the region 126 providing the second set of content 120-2 associated with sports.

Similarly, all avatars 128 of a subset having a common interest in shoes, and the like, may view the third set of content 120-2 associated with shoes (e.g. as indicated by the indicator 134-3) at the region 126 and hence an output component of the associated client devices 110 output scenes (e.g. rendered by the scene rendering engine 130) that include the region 126 providing the third set of content 120-2 associated with shoes.

Hence, different subsets of the avatars 128, viewing the region 126, view different content 120 that is common to a given subset, but different between the subsets.

As previously described such determination of the subsets may be even more particular, and based on given types of a given set of content 120, for example, as previously described, types of shoes available in the third set of content 120-3.

Such causing of client devices 110 to provide the respective content 120 may occur via the controller 202 and/or the computing device 102 outputting, to the virtual platform 106, data and/or a command that includes identifiers of the subsets of the avatars 128 (e.g. such as associated user identifiers) in association with identifiers of associated content 120 (e.g. such as respective network addresses of the associated content 120, and/or respective indicators 134, and the like). The scene rendering engine 130 may render respective scenes for the respective avatars 128 of the subsets accordingly.

The method 300 may include other features.

In some examples, a number of the subsets of the avatars 128 may be limited to a given number. In these examples, the method 300 may further comprise the controller 202 and/or the computing device 102: distributing all of the avatars 128 between the subsets. Using the example of FIG. 1, as there are three sets of content 120, a number of the subsets of the avatars 128 may be limited to a given number of "3", each associated with a given set of content 120, and the avatars 128 may be distributed amongst three subsets. However, the given number of the subsets may be any suitable number of "2" or higher. Furthermore, such a given number of the subsets may be less than or equal to a number of the sets of content 120.

Furthermore, a number of the subsets of the avatars 128 need not correspond to the number of the sets of content 120.

For example, in the aforementioned example where the third set of content 120-3 relates to shoes, and all the avatars 128 have an associated interest of shoes, the number of subsets of avatars 128 may be two, corresponding to two categories of shoes indicated by the third set of content 120-3. However, in some examples, the controller 202 and/or the computing device 102 may distribute all of the avatars 128 between the subsets whether all the avatars 128 have an associated interest or not.

For example, the method 300 may further comprise the controller 202 and/or the computing device 102: assigning respective probability scores to the avatars 128 being associated with the respective content 120 of the subsets; and grouping the avatars 128 into the subsets based on the respective probability scores.

Such probability sores may be generated by the aforementioned machine learning algorithm, and the like. For example, the static data 118 (e.g. an account profile 114) and/or the dynamic data 132 associated with a given avatar 128, along with the content 120 and/or associated indicators 134, may be input to a machine learning algorithm which may output respective identifiers of the sets of content 120 and respective probability scores that the given avatar 128 is associated each set of content 120. For example, a given avatar 128 may have a 95% probability of being associated with the first set of the content 120-1, a 65% probability of being associated with the second set of the content 120-2, and a 30% probability of being associated with the third set of the content 120-3. In this example, the given avatar 128 may be grouped into a subset associated with the first set of the content 120-1 as the probability of being associated with the first set of the content 120-1 is higher than the other probabilities.

Put another way, the method 300 may further comprise the controller 202 and/or the computing device 102: assigning respective probability scores to the avatars 128 being associated with the respective content 120 of the subsets; and grouping the avatars 128 into the subsets based on highest respective probability scores.

However, such probability scores may be generated in any suitable manner, including, but not limited to, using programmatic algorithms (e.g. in addition to, or alternative to, machine learning algorithms).

Furthermore, the probability scores may be used in other ways.

For example, the method 300 may further comprise the controller 202 and/or the computing device 102: assigning respective probability scores to the avatars 128 being associated with the respective content 120 of the subsets; and grouping the avatars 128 into the subsets based on the respective probability scores being above a probability threshold.

For example, such a probability threshold may be 75%, 80%, 90%, amongst other possibilities. When respective probability scores are assigned to the avatars 128 being associated with the respective content 120 of the subsets, such respective probability scores may be compared to the probability threshold, and an avatar 128 may be grouped into a subset associated with the respective content 120 when a respective probability score is above the probability threshold.

When more than one respective probability score of an avatar 128 being associated with the respective content 120 of the subsets is above the probability threshold, the avatar 128 may be grouped into a subset associated with the respective content 120 that has the highest respective probability score.

In some examples, probability threshold may differ for different sets of the content 120. For example, a probability threshold for the first set of content 120-1 may be 95%, a probability threshold for the second set of content 120-2 may be 70%, and a probability threshold for the third set of content 120-3 may be 60%. Hence, when a given avatar has respective probability scores of 90%, 68% and 65% of being respectively associated with the first, second and third sets of content 120-1, 120-2, 120-3, the given avatar 128 may be grouped into the third set of the content 120-3. In particular, as the respective probability scores of 90%, 68% are below the respective probability thresholds of 90%, 68% of the first and second sets of content 120-1, 120-2, and as the respective probability score of 65% is above the respective probability threshold of 60% of the third set of content 120-3, the given avatar 128 may be grouped into the third set of the content 120-3.

Furthermore, when no respective probability score of an avatar 128 being associated with the respective content 120 of the subsets is above the probability threshold, the avatar 128 may be grouped into a subset associated with the generic content 121.

In particular, in examples where a number of the subsets are limited to a given number, a given subset may be dedicated to the generic content 121. In these examples, the method 300 may further comprise the controller 202 and/or the computing device 102: assigning respective probability scores to the avatars 128 being associated with respective content of the subsets; grouping the avatars 128 into the subsets based on the respective probability scores being above one or more respective threshold probability scores; and when a given group of the avatars 128 are associated with probability scores that are below the respective threshold probability scores, grouping the given group of the avatars 128 into the given subset such that the respective client devices 110 associated with the given subset of the avatars 128 provides the generic content 121.

Hence, the controller 202 and/or the computing device 102 determines that an avatar 128 is not associated with any of the content 120, that avatar 128 may be grouped into a subset associated with the generic content 121. In such examples, the generic content 121 may comprise any suitable content, and which may include content related to goods and/or services that an entity associated with a target platform 122 that pays an entity associated with virtual platform 106 to provide the generic content 121, for example at the region 126 when the other content 120 is not provided.

Indeed, in some examples, prior to the method 300 being implemented, the generic content 121 may be provided at the region 126.

In some examples, the method 300 may be adapted for avatars 128 that one or more of come within the given distance of the avatars 128, and enter the common area, for example after the subsets are determined at the block 306. Such a situation may occur when a client device 110 logs into the virtual platform 106 and a new avatar 128 is added to the virtual platform 106, and/or when a client device 110 controls a respective avatar 128 to be within the given distance of the avatars 128, and/or to enter the common area.

For example, the method 300 may further comprise the controller 202 and/or the computing device 102: in response to an additional avatar 128 one or more of coming within the given distance of the avatars 128, and entering the common area, assigning the additional avatar 128 to an existing subset based on one or more of associated static data 118 and associated dynamic data 132; and causing a respective client device 110 associated with the additional avatar 128 to provide the respective content associated with the existing subset.

Put another way, when an avatar 128, being controlled via a respective client device 110, that is not initially within the given distance of the avatars 128, or in the common area, and later comes within the given distance of the avatars 128, and/or enters the common area, respective probabilities of the additional avatar 128 being associated with any of the existing subsets and/or with associated content 120 may be determined, and the additional avatar 128 may be grouped into an existing subset accordingly (e.g. based a highest respective probability and/or threshold probabilities, as has already been described.

In particular, the method 300 may alternatively, or in addition, further comprise the controller 202 and/or the computing device 102: in response to an additional avatar 128 one or more of coming within the given distance of the avatars 128, and entering the common area, comparing one or more of associated static data 118 and associated dynamic data 132 of the additional avatar 128 with existing subsets to generate respective probabilities of one or more of the associated static data 118 and the associated dynamic data 132 of the additional avatar 128 being comparable to the existing subsets; and grouping the additional avatar 128 to an existing subset having a highest respective probability.

However, when an avatar 128, being controlled via a respective client device 110, that is not initially within the given distance of the avatars 128, or in the common area, and later comes within the given distance of the avatars 128, and/or enters the common area, respective probabilities of the additional avatar 128 being associated with any of the existing subsets and/or with associated content 120 may be determined. When the controller 202 and/or the computing device 102 determines that the additional avatar 128 with any of the existing subsets associated with the content 120, the additional avatar 128 may be grouped into a subset associated with the generic content 121.

Attention is next directed to FIG. 4, FIG. 5, FIG. 6, FIG. 7, and FIG. 8, which depicts an example of aspects of the method 300. FIG. 4, FIG. 5, FIG. 6, FIG. 7, and FIG. 8 are substantially similar to FIG. 1, with like components having like numbers.

Figure 4:
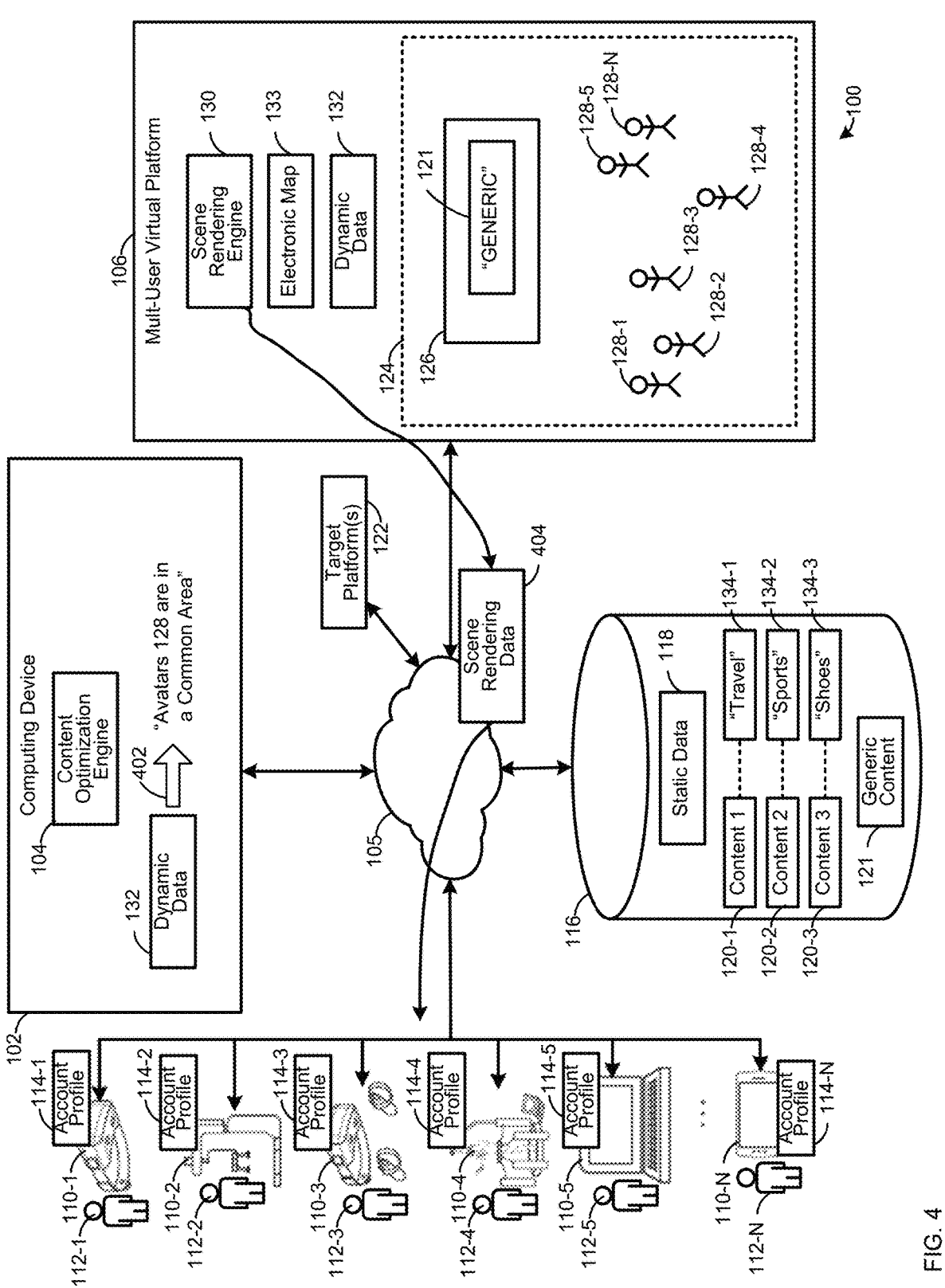
FIG. 4 depicts the system of FIG. 1 implementing aspects of a method for more efficiently controlling client devices to provide common content, according to non-limiting examples.

With attention first directed to FIG. 4, the computing device 102 has accessed the dynamic data 132, as described herein, which is understood to include the locations of the avatars 128, and determined (e.g. at the block 302 of the method 300, as represented by an arrow 402) that the "Avatars 128 are in a Common Area", such as a common area in front of the region 126.

As also depicted in FIG. 4, the virtual platform 106 is initially controlling the region 126 to provide, for all the avatars 128, the generic content 121 (e.g. which may comprise a link to a target platform 122 selling a variety of goods and/or services, the link including the text "Buy Stuff!"). For example, the scene rendering engine 130 may generate respective scene rendering data 404 including the generic content 121, but customized from a perspective of each of the avatars 128, and provide the respective scene rendering data 404 to all the respective client devices 110-1, which may provide the generic content 121 at a respective output components. One or more of the client devices 110 may be operated to select a link of the generic content 121 to divert a respective client device 110 to such an associated target platform 122, which may result in a purchase of good and/or services by a respective client device 110.

Figure 5:
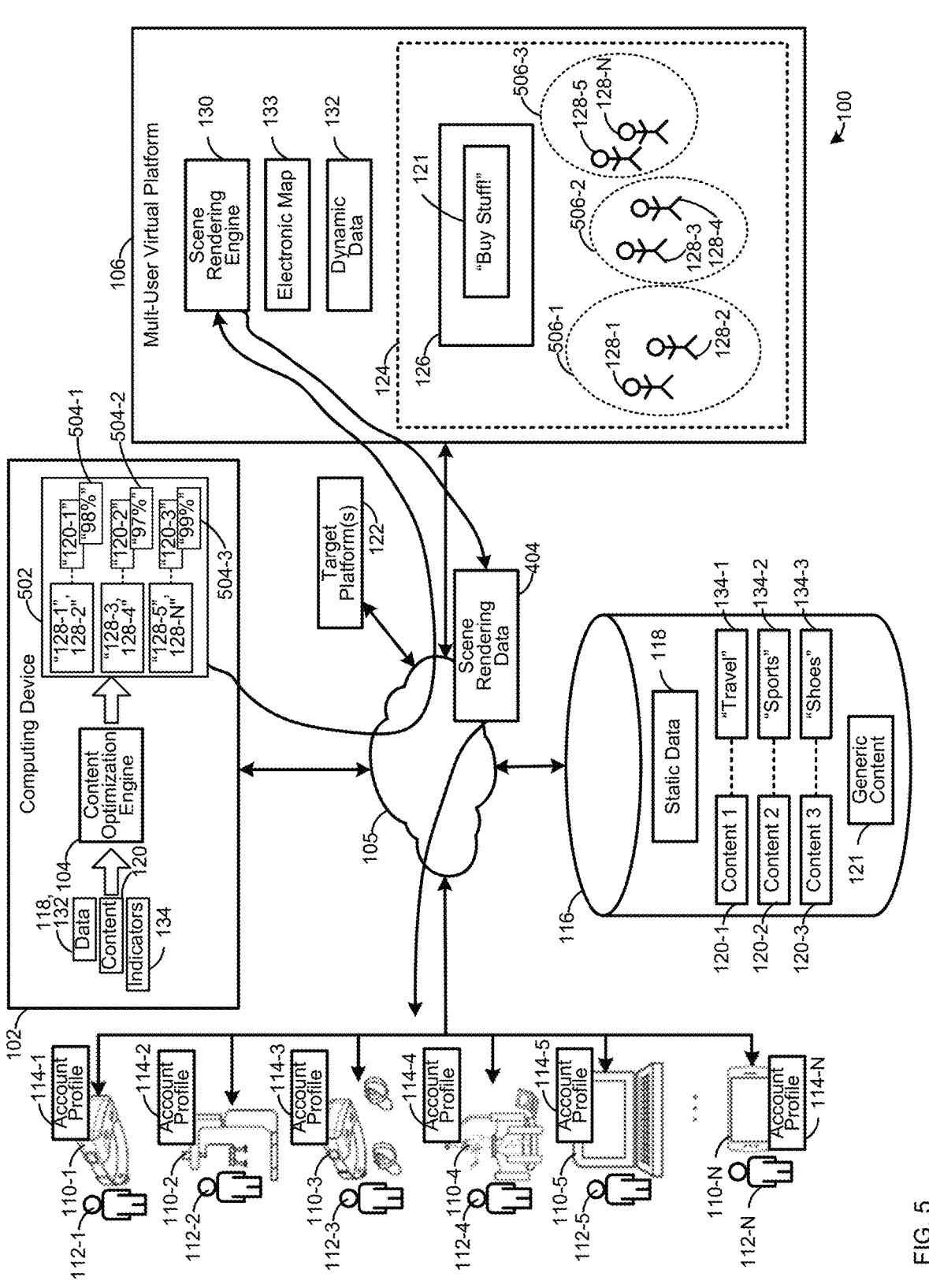
FIG. 5 depicts the system of FIG. 1 implementing aspects of a method for more efficiently controlling client devices to provide common content, according to non-limiting examples.

FIG. 5 depicts the computing device 102 having accessed (e.g. at the block 304 of the method 300) respective data associated with the avatars 128, including the data 118, 132. Furthermore, FIG. 5 depicts the computing device 102 determining (e.g. at the block 306 of the method 300), from the data 118, 132, as well as the content 120 and/or the indicators 134, subsets of the avatars 128 associated with respective content 120.

For example, as depicted, the data 118, 132, and the content 120 and/or the indicators 134, are used as input to the content optimizer engine 104, which outputs data 502 indicating that a subset of the avatars 128-1, 128-2 are associated with the first set of content 120-1, a subset of the avatars 128-3, 128-4 are associated with the second set of avatars 128-3, 128-4 are associated with the second set of content 120-2, and a subset of the avatars 128-5, 128-N are associated with the third set of content 120-3.

For example, as depicted, the data 502 comprises:
identifiers "128-1, 128-2", respectively identifying the avatars 128-1, 128-2, as associated with an identifier "120-1" of the first set of content 120-1 (as indicated by a broken line therebetween;
identifiers "128-3, 128-4", respectively identifying the avatars 128-3, 128-4, as associated with an identifier "120-2" of the second set of content 120-2 (as indicated by a broken line therebetween); and
identifiers "128-5, 128-N", respectively identifying the avatars 128-5, 128-N, as associated with an identifier "120-3" of the third set of content 120-3 (as indicated by a broken line therebetween).

Furthermore, each of the subsets are associated with a respective probability score 504-1, 504-2, 504-3 (e.g. probability scores 504 and/or a probability score 504) that the respective avatars 128 are associated with the respective content 120, the probability scores 504 output by the content optimizer engine 104. As depicted, the avatars 128-1, 128-2 have a 98% probability of being associated with the first set of content 120-1, the avatars 128-3, 128-4 have a 97% probability of being associated with the second set of content 120-2, and the avatars 128-5, 128-N have a 99% probability of being associated with the third set of content 120-3. While not depicted, the content optimizer engine 104 may output respective probability scores of each of the avatars 128 being associated with each of the sets of content 120; hence the depicted probability scores 504 may be the highest probability scores of such respective probability scores. Furthermore, the depicted probability scores 504 may be greater than a threshold probability, such as 95%.

Hence, as depicted, the avatars 128-1, 128-2 may be grouped into a first subset 506-1, the avatars 128-3, 128-4 may be grouped into a second subset 506-2, and the avatars 128-5, 128-N may be grouped into a third subset 506-3 (e.g. the subsets 506 and/or a subset 506).

Figure 6:
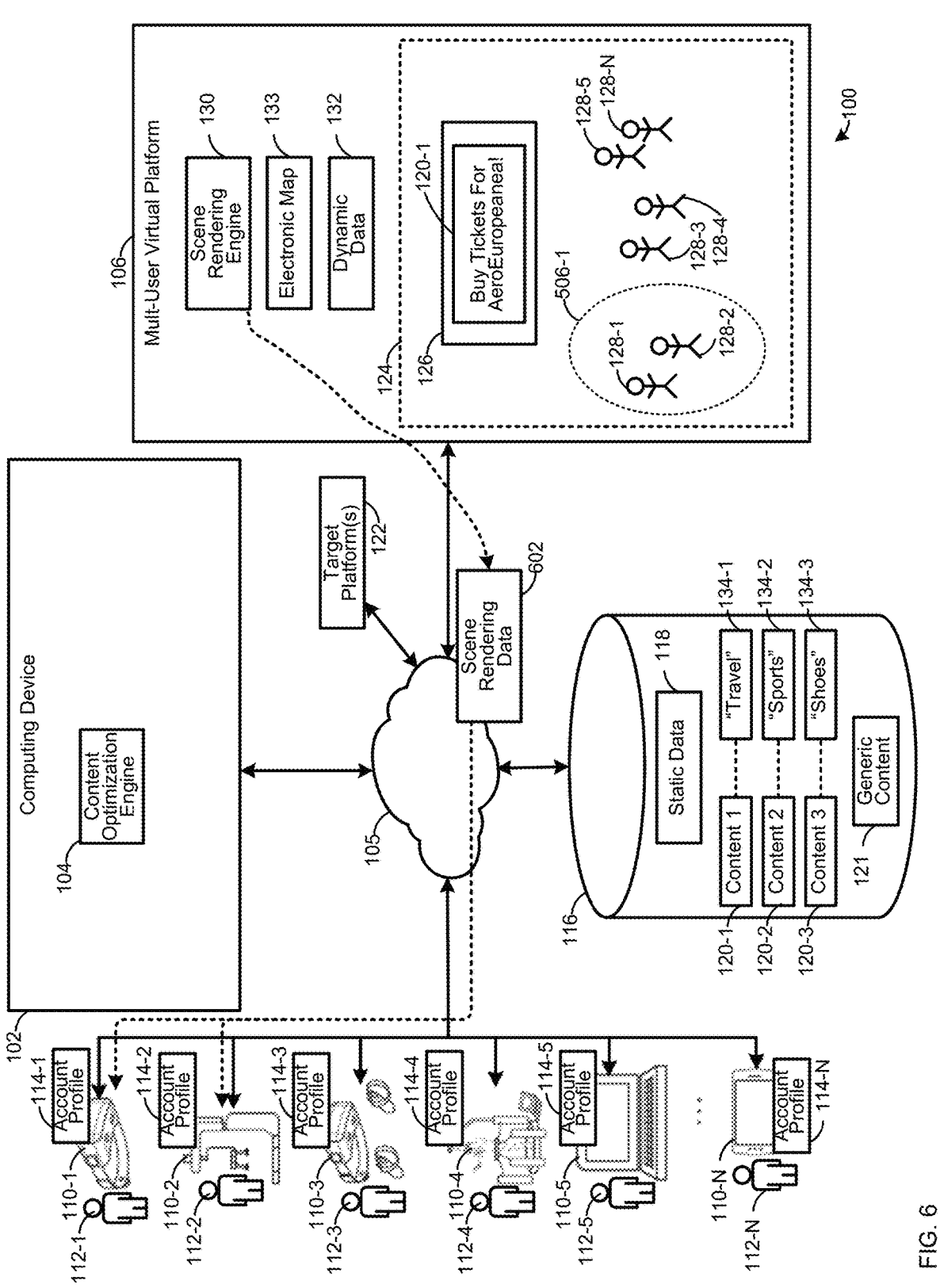
FIG. 6 depicts the system of FIG. 1 implementing aspects of a method for more efficiently controlling client devices to provide common content, according to non-limiting examples.
Figure 7:
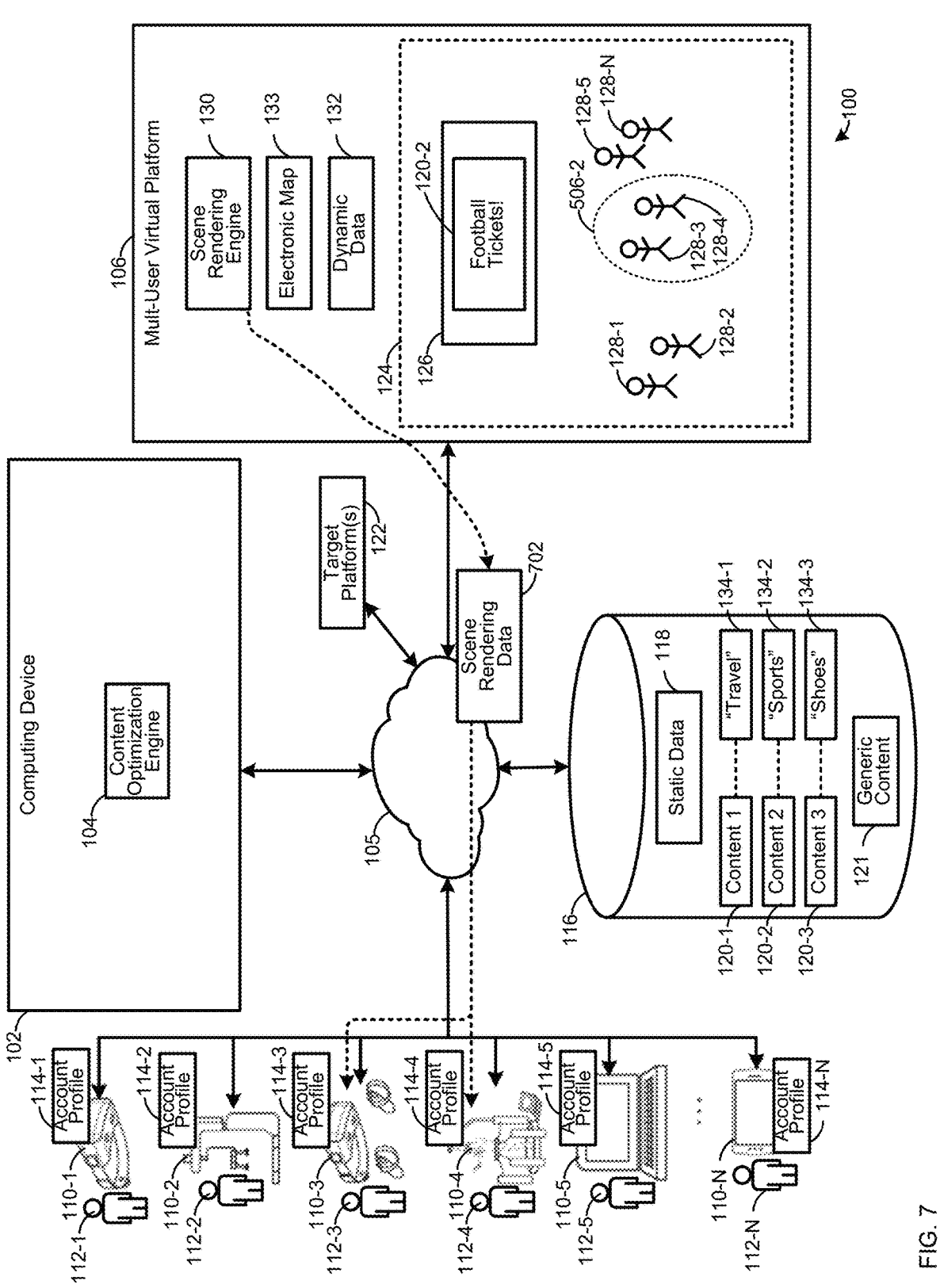
FIG. 7 depicts the system of FIG. 1 implementing aspects of a method for more efficiently controlling client devices to provide common content, according to non-limiting examples.
Figure 8:
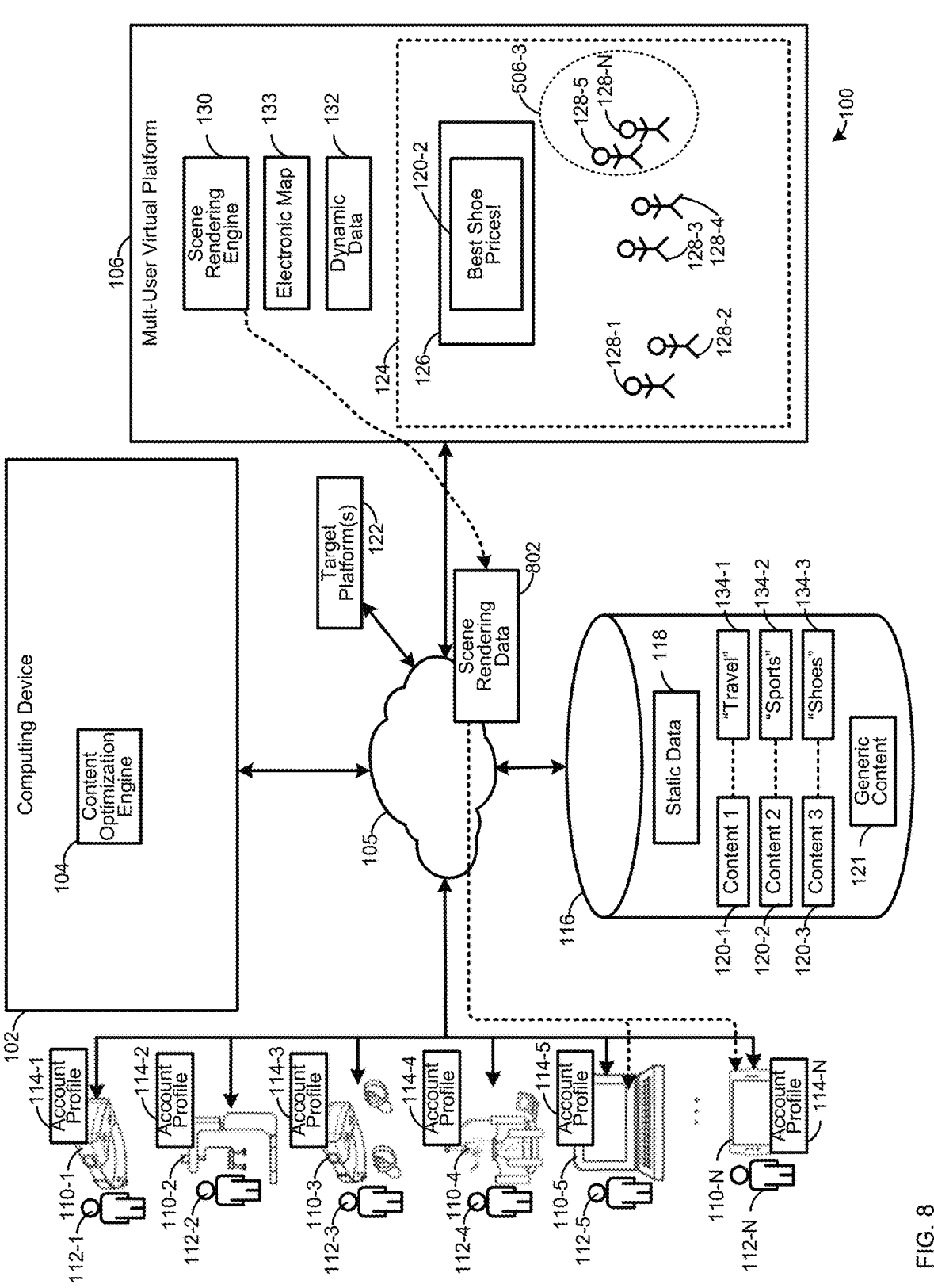
FIG. 8 depicts the system of FIG. 1 implementing aspects of a method for more efficiently controlling client devices to provide common content, according to non-limiting examples.

As depicted, the computing device 102 may provide the data 502, for example in the form of a command, and the like, to the virtual platform 106, which causes (e.g. at the block 308 of the method 300), the respective client devices 110, associated with the avatars 128 of the subsets, to provide the respective content 120, as is next described with respect to FIG. 6, FIG. 7 and FIG. 8. In particular, the examples of FIG. 6, FIG. 7 and FIG. 8 are understood to occur concurrently.

In particular, FIG. 6 depicts the virtual platform 106 controlling the region 126 to provide, for the first subset 506-1, the first set of content 120-1 associated with travel (e.g. which may comprise a link to a target platform 122 selling airline tickets for a particular airline, the link including the text "Buy Tickets For AeroEuropeana!"), for example as the avatars 128-1, 128-2 of the first subset 506-1 may have a common interest in travel. Hence, for example, the scene rendering engine 130 may generate respective scene rendering data 602 including the first set of content 120-1, but customized from a perspective of each of the avatars 128-1, 128-2, and provide the respective scene rendering data 602 to the respective client devices 110-1, 110-2, which may provide the first set of content 120-1 at a respective output components. One or more of the client devices 110-1, 110-2 may be operated to select a link of the first set of content 120-1 to divert a respective client device 110-1, 110-2 to such an associated target platform 122, which may result in a purchase of airline tickets by a respective client device 110-1, 110-2.

Similarly, FIG. 7 depicts the virtual platform 106 controlling the region 126 to provide, for the second subset 506-2, the second set of content 120-2 associated with sports (e.g. which may comprise a link to a target platform 122 selling game tickets for a particular sport, the link including the text "Buy Football Tickets!"), for example as the avatars 128-3, 128-4 of the second subset 506-2 may have a common interest in sports. Hence, for example, the scene rendering engine 130 may generate respective scene rendering data 702 including the second set of content 120-2, but customized from a perspective of each of the avatars 128-3, 128-4, and provide the respective scene rendering data 702 to the respective client devices 110-3, 110-4, which may provide the second set of content 120-2 at a respective output components. One or more of the client devices 110-3, 110-4 may be operated to select a link of the second set of content 120-2 to divert a respective client device 110-3, 110-4 to such an associated target platform 122, which may result in a purchase of football tickets by a respective client device 110-3, 110-4.

Similarly, FIG. 8 depicts the virtual platform 106 controlling the region 126 to provide, for the third subset 506-3, the third set of content 120-3 associated with shoes (e.g. which may comprise a link to a target platform 122 selling shoes, the link including the text "Best Price Shoes!"), for example as the avatars 128-5, 128-N of the third subset 506-3 may have a common interest in shoes. Hence, for example, the scene rendering engine 130 may generate respective scene rendering data 802 including the third set of content 120-3, but customized from a perspective of each of the avatars 128-5, 128-N, and provide the respective scene rendering data 802 to the respective client devices 110-3, 110-4, which may provide the third set of content 120-3 at a respective output component. One or more of the client devices 110-5, 110-N may be operated to select a link of the third set of content 120-3 to divert a respective client device 110-5, 110-N to such an associated target platform 122, which may result in a purchase of shoes by a respective client device 110-5, 110-N.

Hence, as the examples of FIG. 6, FIG. 7 and FIG. 8 may occur concurrently, the client devices 110 may be concurrently and efficiently controlled to change from providing the generic content 121, as depicted in FIG. 4 and FIG. 5, to providing respective content 120, depending with which of the subsets 506 a respective avatar 128 is associated.

Figure 9:
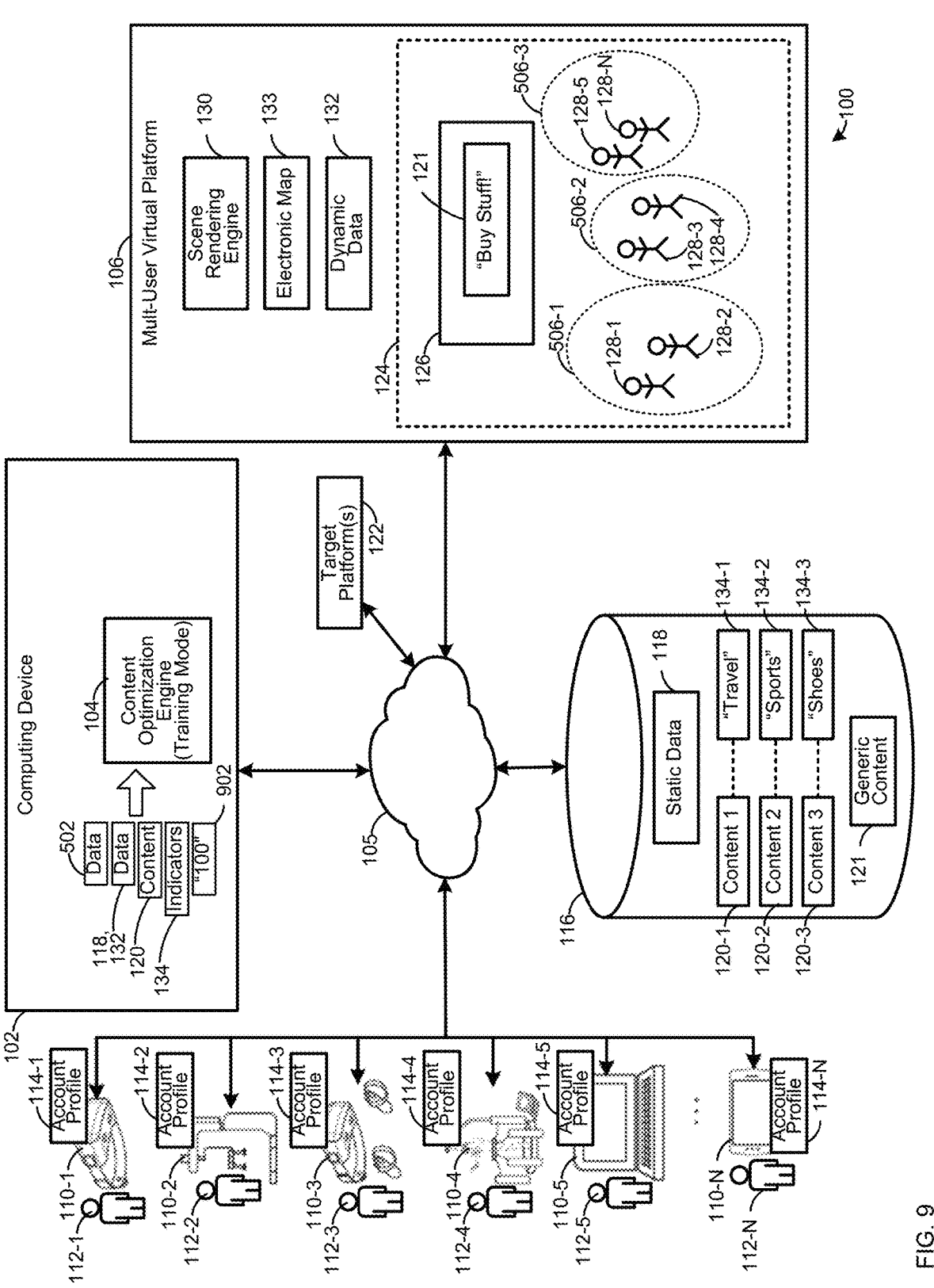
FIG. 9 depicts the system of FIG. 1 implementing a machine learning feedback loop to train a computing device thereof to more efficiently implement a method for more efficiently controlling client devices to provide common content, according to non-limiting examples.

With attention next directed to FIG. 9, after the data 502 is generated, a machine learning algorithm of the content optimizer engine 104 may be operated in a training mode, in which the data 118, 132, 502, the content 120 and/or the indicators 134 are labelled with a label 902 of "100", indicating that the data 502, generated from the data 118, 132, the content 120 and/or the indicators 134 was accurate and hence represents a positive training example for the machine learning algorithm. The label 902 may be used to correct the scores 504 and may be generated by an administrator of the system 100 and/or in any suitable manner. Such a label 902 of "100" assumes that the data 502 was 100% accurate.

However, in examples where the data 502 was not accurate, the label 902 may comprise a value of "0" or any suitable value between "0" and "100". When the label 902 comprises a value of "0", such a label 902 may indicate that data 502, generated from the data 118, 132, the content 120 and/or the indicators 134 was inaccurate and hence represents a negative training example for the machine learning algorithm Hence, the data 502, and the data 118, 132, the content 120 and/or the indicators 134, may be used in a machine learning feedback loop to better train the machine learning algorithm to select subsets of avatars, and/or to cause the computing device 102 and/or the content optimizer engine 104 to operate more efficiently.

As should by now be apparent, the operations and functions of the devices described herein are sufficiently complex as to require their implementation on a computer system, and cannot be performed, as a practical matter, in the human mind. In particular, computing devices, and the like, such as set forth herein, are understood as requiring and providing speed and accuracy and complexity management that are not obtainable by human mental steps, in addition to the inherently digital nature of such operations (e.g., a human mind cannot interface directly with a virtual environment, control the virtual environment to provide interactive environments and/or content, amongst other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is further understood that instance of the term "configured to", such as "a computing device configured to . . . ", "a processor configured to . . . ", "a controller configured to . . . ", and the like, may be understood to include a feature of a computer-readable storage medium having stored thereon program instructions that, when executed by a computing device and/or a processor and/or a controller, and the like, may cause the computing device and/or the processor and/or the controller to perform a set of operations which may comprise the features that the computing device and/or the processor and/or the controller, and the like, are configured to implement. Hence, the term "configured to" is understood not to be unduly limiting to means plus function interpretations, and the like.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Unless the context of usage unambiguously indicates otherwise, articles "a," "an," and "the" should not be interpreted as meaning "one" or "only one." Rather such articles should be interpreted as meaning "at least one" or "one or more." Similarly, when the terms "the" or "said" are used to refer to a noun previously introduced by the indefinite article "a" or "an," "the" and "said" mean "at least one" or "one or more" unless the usage unambiguously indicates otherwise.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", in yet further examples "within 0.5%", and in yet further examples "within 0.1%".

Persons skilled in the art will appreciate that in some examples, the functionality of devices and/or methods and/or processes described herein may be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein may be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program may be stored as a computer program product comprising a computer usable medium. Further, a persistent storage device may comprise the computer readable program code. It is yet further appreciated that the computer-readable program code and/or computer usable medium may comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium may be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:

determining, via a computing device, that avatars, associated with client devices interfacing with a multi-user virtual platform, are one or more of: within a given distance of each other in the multi-user virtual platform; and located in a common area of the multi-user virtual platform;

accessing, via the computing device, respective data associated with the avatars, the respective data comprising one or more of: respective static data associated with users of the client devices; and respective dynamic data indicative of one or more of orientation of the avatars within the multi-user virtual platform and interactions of two or more of the avatars within the multi-user virtual platform;

determining, via the computing device, from the respective data: subsets of the avatars associated with respective content, the subsets each including two or more of the avatars; and causing, via the computing device, respective client devices, associated with the avatars of the subsets, to provide the respective content in association with the avatars of the subsets, such that two or more of the respective client devices associated with a same subset provide respective common content, wherein the respective content is provided at a region of the common area of the multi-user virtual platform that is viewable by the subsets while the subsets are located in the common area, and wherein causing the respective client devices to provide the respective content comprises causing client devices associated with avatars of different subsets to provide different content at the region, while client devices associated with avatars of a same subset provide common content at the region, wherein content of the common area outside the region is provided commonly to the subsets.

2. The method of claim 1, wherein the respective static data comprises one or more of:

relationship data;

geolocation data;

interest data; and social media data.

3. The method of claim 1, wherein the respective dynamic data indicative of the orientation of the avatars within the multi-user virtual platform comprises one or more of:

respective locations of the avatars within the multi-user virtual platform;

respective head orientation of the avatars within the multi-user virtual platform;

respective movement of the avatars within the multi-user virtual platform; and respective directions that the avatars are looking within the multi-user virtual platform.

4. The method of claim 1, wherein the respective dynamic data indicative of the interactions of two or more of the avatars within the multi-user virtual platform comprises one or more of:

conversations between two or more of the avatars within the multi-user virtual platform;

common movement of two or more of the avatars within the multi-user virtual platform;

common actions of two or more of the avatars within the multi-user virtual platform; and accessing of common multimedia of two or more of the avatars within the multi-user virtual platform.

5. The method of claim 1, wherein a number of the subsets are limited to a given number, and the method further comprises:

distributing all of the avatars between the subsets.

6. The method of claim 1, further comprising:

assigning respective probability scores to the avatars being associated with the respective content of the subsets; and grouping the avatars into the subsets based on the respective probability scores.

7. The method of claim 1, further comprising:

assigning respective probability scores to the avatars being associated with the respective content of the subsets; and grouping the avatars into the subsets based on the respective probability scores being above a probability threshold.

8. The method of claim 1, wherein a number of the subsets are limited to a given number,

wherein a given subset is dedicated to generic content, and the method further comprises:

assigning respective probability scores to the avatars being associated with respective content of the subsets;

grouping the avatars into the subsets based on the respective probability scores being above one or more respective threshold probability scores; and when a given group of the avatars are associated with probability scores that are below the respective threshold probability scores, grouping the given group of the avatars into the given subset such that the respective client devices associated with the given subset of the avatars provide the generic content.

9. The method of claim 1, further comprising:

in response to an additional avatar one or more coming within the given distance of the avatars, and entering the common area, assigning the additional avatar to an existing subset based on one or more of associated static data and associated dynamic data; and causing a respective client device associated with the additional avatar to provide the respective content associated with the existing subset.

10. The method of claim 1, further comprising:

in response to an additional avatar one or more of coming within the given distance of the avatars, and entering the common area, comparing one or more of associated static data and associated dynamic data of the additional avatar with existing subsets to generate respective probabilities one or more of the associated static data and the associated dynamic data of the additional avatar being comparable to the existing subsets; and grouping the additional avatar to an existing subset having the highest respective probability.

11. A computing device comprising:

a controller; and a non-transitory computer-readable storage medium having stored thereon program instructions that, when executed by the controller, causes the controller to perform a set of operations comprising:

determining that avatars, associated with client devices interfacing with a multi-user virtual platform, are one or more of: within a given distance of each other in the multi-user virtual platform; and located in a common area of the multi-user virtual platform;

accessing respective data associated with the avatars, the respective data comprising one or more of: respective static data associated with users of the client devices; and respective dynamic data indicative of one or more of orientation of the avatars within the multi-user virtual platform and interactions of two or more of the avatars within the multi-user virtual platform; determining, from the respective data: subsets of the avatars associated with respective content, the subsets each including two or more of the avatars; and causing respective client devices, associated with the avatars of the subsets, to provide the respective content in association with the avatars of the subsets, such that two or more of the respective client devices associated with a same subset provide respective common content, wherein the respective content is provided at a region of the common area of the multi-user virtual platform that is viewable by the subsets while the subsets are located in the common area, and

wherein causing the respective client devices to provide the respective content comprises causing client devices associated with avatars of different subsets to provide different content at the region, while client devices associated with avatars of a same subset provide common content at the region, wherein content of the common area outside the region is provided commonly to the subsets.

12. The computing device of claim 11, wherein the respective static data comprises one or more of:

relationship data;

geolocation data;

interest data; and social media data.

13. The computing device of claim 11, wherein the respective dynamic data indicative of the orientation of the avatars within the multi-user virtual platform comprises one or more of:

respective locations of the avatars within the multi-user virtual platform;

respective head orientation of the avatars within the multi-user virtual platform;

respective movement of the avatars within the multi-user virtual platform; and respective directions that the avatars are looking within the multi-user virtual platform.

14. The computing device of claim 11, wherein the respective dynamic data indicative of the interactions of two or more of the avatars within the multi-user virtual platform comprises one or more of:

conversations between two or more of the avatars within the multi-user virtual platform;

common movement of two or more of the avatars within the multi-user virtual platform;

common actions of two or more of the avatars within the multi-user virtual platform; and accessing of common multimedia of two or more of the avatars within the multi-user virtual platform.

15. The computing device of claim 11, wherein a number of the subsets are limited to a given number, and the set of operations further comprises:

distributing all of the avatars between the subsets.

16. The computing device of claim 11, wherein the set of operations further comprises:

assigning respective probability scores to the avatars being associated with the respective content of the subsets; and grouping the avatars into the subsets based on the respective probability scores.

17. The computing device of claim 11, wherein the set of operations further comprises:

assigning respective probability scores to the avatars being associated with the respective content of the subsets; and grouping the avatars into the subsets based on the respective probability scores being above a probability threshold.

18. The computing device of claim 11, wherein a number of the subsets are limited to a given number, wherein a given subset is dedicated to generic content, and the set of operations further comprises:

assigning respective probability scores to the avatars being associated with respective content of the subsets;

grouping the avatars into the subsets based on the respective probability scores being above one or more respective threshold probability scores; and when a given group of the avatars are associated with probability scores that are below the respective threshold probability scores, grouping the given group of the avatars into the given subset such that the respective client devices associated with the given subset of the avatars provide the generic content.

19. The computing device of claim 11, wherein the set of operations further comprises:

in response to an additional avatar one or more coming within the given distance of the avatars, and entering the common area, assigning the additional avatar to an existing subset based on one or more of associated static data and associated dynamic data; and causing a respective client device associated with the additional avatar to provide the respective content associated with the existing subset.

20. The computing device of claim 11, wherein the set of operations further comprises:

in response to an additional avatar one or more of coming within the given distance of the avatars, and entering the common area, comparing one or more of associated static data and associated dynamic data of the additional avatar with existing subsets to generate respective probabilities one or more of the associated static data and the associated dynamic data of the additional avatar being comparable to the existing subsets; and grouping the additional avatar to an existing subset having the highest respective probability.

* * * * *